(12) United States Patent
Chimmalgi et al.

(10) Patent No.: US 9,941,655 B2
(45) Date of Patent: Apr. 10, 2018

(54) HIGH POWER BROADBAND LIGHT SOURCE

(71) Applicant: KLA-Tencor Corporation, Milpitas, CA (US)

(72) Inventors: Anant Chimmalgi, San Jose, CA (US); Rahul Yadav, Sunnyvale, CA (US); Anatoly Shchemelinin, Pleasanton, CA (US); Ilya Bezel, Sunnyvale, CA (US); Matthew Derstine, Los Gatos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 187 days.

(21) Appl. No.: 14/667,235

(22) Filed: Mar. 24, 2015

(65) Prior Publication Data

US 2015/0333471 A1   Nov. 19, 2015

Related U.S. Application Data

(60) Provisional application No. 61/970,061, filed on Mar. 25, 2014.

(51) Int. Cl.
*H05G 2/00* (2006.01)
*H01S 3/0915* (2006.01)
(Continued)

(52) U.S. Cl.
CPC .......... *H01S 3/0915* (2013.01); *G02B 6/2804* (2013.01); *G02B 6/4296* (2013.01);
(Continued)

(58) Field of Classification Search
CPC .... H01S 3/0915; H01S 3/0071; H01S 3/2383; G02B 6/4296; G02B 6/2804; H05G 2/008
(Continued)

(56) References Cited

U.S. PATENT DOCUMENTS 7,059,778 B2 *   6/2006   Suzuki ................... B82Y 10/00
                                              385/53
2006/0292311 A1 *  12/2006  Kilburn ..................... F26B 3/28
                                              427/487

(Continued)

FOREIGN PATENT DOCUMENTS

JP          2013-187505 A       9/2013

OTHER PUBLICATIONS

PCT International Search Report for International Application No. PCT/US2015/022498, dated Jun. 30, 2015, 3 pages.

*Primary Examiner* — Michael Maskell
(74) *Attorney, Agent, or Firm* — Suiter Swantz pc llo

(57) ABSTRACT

A system for generating high power broadband light includes multiple light-sustained plasma light sources. Each one of the light-sustained sources includes a pumping source, a gas containment structure for containing gas and configured to receive pumping illumination from the pumping source and a parabolic reflector element arranged to collect at least a portion of the broadband radiation emitted by the generated plasma and form a collimated broadband radiation output. The system also including a set of optical elements configured to combine the collimated broadband outputs from the parabolic reflector elements of the multiple light-sustained plasma light sources into an aggregated broadband beam.

44 Claims, 15 Drawing Sheets

(51) Int. Cl.
*H01S 3/00* (2006.01)
*G02B 6/42* (2006.01)
*G02B 6/28* (2006.01)
*H01S 3/23* (2006.01)

(52) U.S. Cl.
CPC .......... H01S 3/0071 (2013.01); H05G 2/008 (2013.01); H01S 3/2383 (2013.01)

(58) Field of Classification Search
USPC .......................... 250/453.11–455.11, 504 R
See application file for complete search history.

(56) References Cited

U.S. PATENT DOCUMENTS

| | | | | |
|---|---|---|---|---|
| 2007/0228288 | A1* | 10/2007 | Smith | B82Y 10/00 250/426 |
| 2010/0210910 | A1* | 8/2010 | Shimotsu | G02B 23/2469 600/178 |
| 2012/0085926 | A1* | 4/2012 | Ingram | G02B 5/02 250/454.11 |
| 2013/0003384 | A1* | 1/2013 | Bezel | G02B 26/06 362/276 |
| 2013/0169893 | A1 | 7/2013 | Ouderkirk et al. | |

* cited by examiner

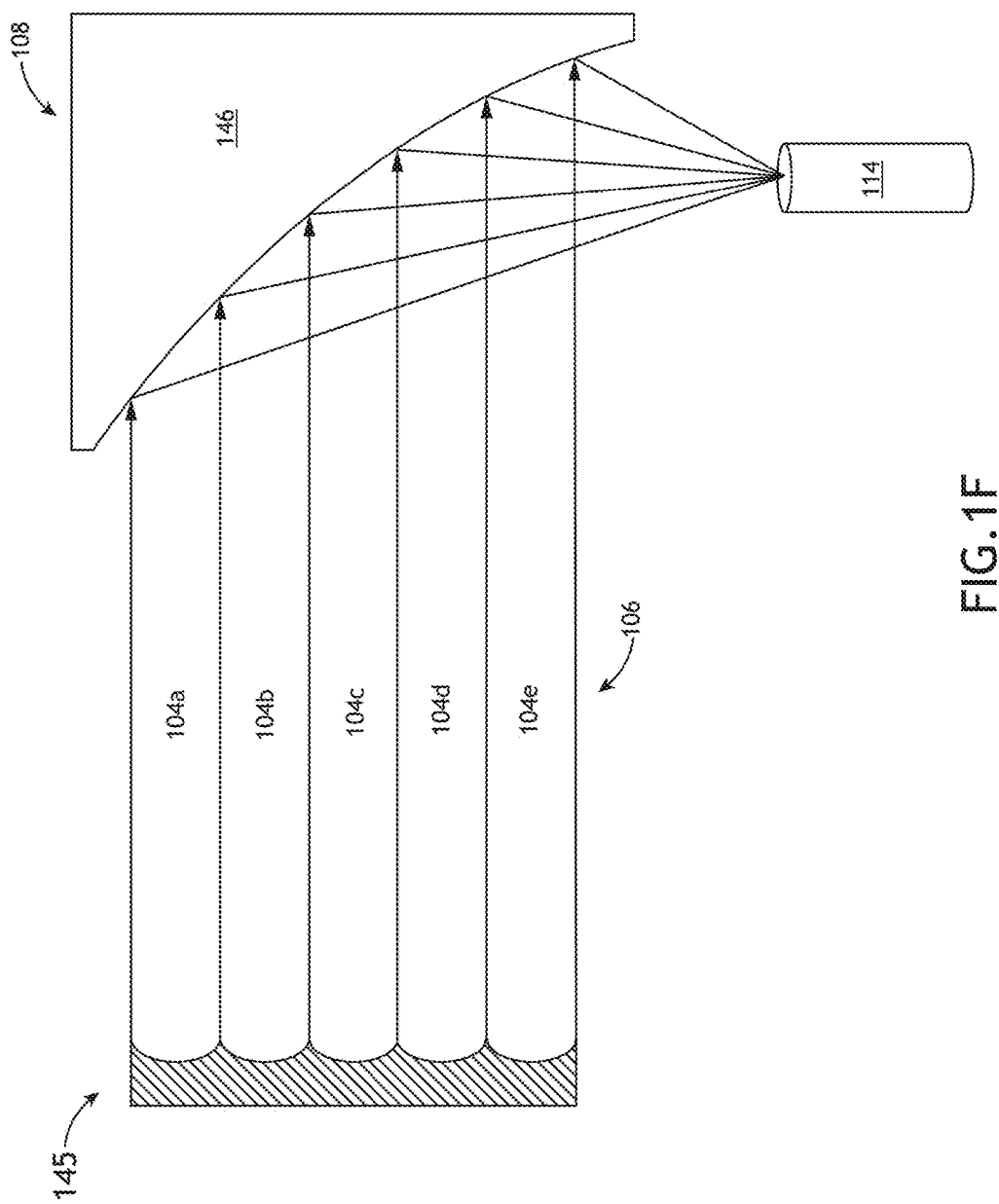

HIGH POWER BROADBAND LIGHT SOURCE

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled METHOD FOR COMBINING LIGHT FROM MULTIPLE LAMP-HOUSES INTO ONE BEAM WITH IMPROVED LIGHT OUTPUT, naming Anant Chimmalgi and Rahul Yadav as inventors, filed Mar. 25, 2014, Application Ser. No. 61/970,061.

TECHNICAL FIELD

The present invention generally relates to broadband light sources, and, more particularly, to a plasma-based light source.

BACKGROUND

As the demand for integrated circuits having ever-smaller device features continues to increase, the need for high power illumination sources used for inspection of these ever-shrinking devices continues to grow. One such illumination source includes a laser-sustained plasma source. Laser-sustained plasma light sources are capable of producing high-power broadband light Laser-sustained light sources operate by focusing laser radiation into a gas volume in order to excite the gas, such as argon or xenon, into a plasma state, which is capable of emitting light. This effect is typically referred to as "pumping" the plasma.

Generally, the most commonly used approach to increasing collectible output power of laser-sustained plasma source is to increase the laser pump power. There exist a variety of additional techniques for increasing the power, which may be used in conjunction with increased pump power. The additional techniques include optimizing laser pump wavelength, optimizing pumping NA, using different lamp gas fill mixtures, aberration control of the light source and optimizing lamp temperature.

Increasing the laser pump power of the laser-sustained source has its limitations. The collectible power of the given laser-sustained source only increases linearly with laser pump power for low pump power (e.g., power is less than 3-4 kW). In contrast, for higher pump power (e.g., power greater than 3-4 kW) saturation is observed in the collective power. This effect is observed in FIG. 1A, which depicts a graph 10 of collectible power versus laser pump power. As observed in FIG. 1A, collectible power begins to saturate at pump powers at approximately 3 kW. The saturation at higher pump power occurs in laser-sustained sources because the associated plasma begins to grow in size with brightness saturation occurring at the center of the plasma. The saturation of collectible power with increasing laser pump power leads to very large laser powers used in a given laser-sustained plasma source. For example, in order to achieve a 140 W collectible power output a laser pump power of approximately 30 kW may be necessary. Using such high laser pump powers, a laser-sustained plasma source is challenging to implement as a result of optical damage and the thermal management of the source. As a result, it would be desirable to provide a system and method for curing defects such as those of the identified above.

SUMMARY

A system for generating high power broadband light is disclosed, in accordance with an illustrative embodiment of the present disclosure. In one illustrative embodiment, the system includes a first light-sustained plasma light source including a first reflector element configured to collect broadband light emitted by a first plasma of the first light-sustained plasma light source. In another illustrative embodiment, the first light-sustained plasma is configured to form a first broadband light output. In another illustrative embodiment, the system includes an additional light-sustained plasma light source including an additional reflector element configured to collect broadband light emitted by an additional plasma of the additional light-sustained plasma light source. In another illustrative embodiment, the additional light-sustained plasma is configured to form an additional broadband light output. In another illustrative embodiment, the system includes a plurality of optical elements configured to combine the first broadband light output from the first light-sustained plasma light source and the additional broadband light output from the additional light-sustained plasma light source to form an aggregated broadband light beam.

A system for generating high power broadband light is disclosed, in accordance with an additional illustrative embodiment of the present disclosure. In one illustrative embodiment, the system includes a first discharge lamp including a first reflector element configured to collect broadband light emitted by a stimulated discharge of the first discharge lamp, the first discharge lamp configured to form a first broadband light output. In another illustrative embodiment, the system includes an additional discharge lamp including an additional reflector element configured to collect broadband light emitted by a stimulated discharge of the additional discharge lamp, the additional discharge lamp configured to form an additional broadband light output. In another illustrative embodiment, the system includes a plurality of optical elements configured to combine the first broadband light output from the first discharge lamp and the additional broadband light output from the additional discharge lamp to form an aggregated broadband light beam.

A system for generating high power broadband light is disclosed, in accordance with an additional illustrative embodiment of the present disclosure. In one illustrative embodiment, the system includes a plurality of light-sustained plasma light sources. In another illustrative embodiment, at least some of the light-sustained plasma light sources comprise: a pumping source configured to generate pumping illumination; a gas containment structure configured to receive the pumping illumination from the pumping source to generate plasma within a volume of gas contained within the gas containment structure, wherein at least a portion the gas containment structure is at least partially transparent to at least a portion of the pumping illumination and at least a portion of broadband radiation emitted by the plasma; and a parabolic reflector element arranged to collect at least a portion of the broadband radiation emitted by the generated plasma and form a collimated broadband radiation output. In another illustrative embodiment, the system includes a plurality of optical elements configured to combine the collimated broadband outputs from the parabolic reflector elements of the at least some of the light-sustained plasma light sources into an aggregated broadband beam, wherein a particular optical element is configured to receive a particular collimated broadband output from a particular light-sustained plasma light source.

A system for generating high power broadband light is disclosed, in accordance with an additional illustrative embodiment of the present disclosure. In one illustrative embodiment, the system includes a plurality of discharge lamps. In another illustrative embodiment, at least some of the discharge lamps comprise: a set of electrodes configured to generate a discharge within a volume of contained gas to generate broadband radiation; and a parabolic reflector element arranged to collect at least a portion of the broadband radiation associated with the discharge and form a collimated broadband radiation output. In another illustrative embodiment, the system includes a plurality of optical elements configured to combine the collimated broadband outputs from the parabolic reflector elements of the at least some of the light-sustained plasma light sources into an aggregated broadband beam, wherein a particular optical element is configured to receive a particular collimated broadband output from a particular discharge lamp.

A system for generating high power broadband light is disclosed, in accordance with an additional illustrative embodiment of the present disclosure. In one illustrative embodiment, the system includes a plurality of broadband light sources. In another illustrative embodiment, the system includes a plurality of optical fibers. In another illustrative embodiment, an output of each broadband light source is optically coupled to an input of one of the optical fibers. In another illustrative embodiment, the outputs of two or more of the optical fibers are consolidated into a fiber bundle.

A system for generating high power broadband light is disclosed, in accordance with an additional illustrative embodiment of the present disclosure. In one illustrative embodiment, the system includes a plurality of broadband light sources. In another illustrative embodiment, the system includes a plurality of sub-homogenizer rods. In another illustrative embodiment, the system includes a plurality of optical elements arranged in an optical cross-bar configuration. In another illustrative embodiment, at least a portion of the optical elements are selectively activatable optical elements configured to selectively couple at least a portion of the plurality of broadband light sources to the plurality of sub-homogenizer rods.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1F is a schematic view of the collection path of multiple light-sustained plasma light sources with parabolic reflector elements, in accordance with one embodiment of the present disclosure.

DETAILED DESCRIPTION OF THE INVENTION

Reference will now be made in detail to the subject matter disclosed, which is illustrated in the accompanying drawings.

Referring generally to FIGS. 1B through 4C, a system and method for generating a high power light output is described in accordance with the present disclosure. Embodiments of the present disclosure are directed to the generation of high power broadband light through the aggregation of light output from multiple broadband sources, such as light-sustained plasma light sources and/or arc lamp sources. Through the aggregation of light from multiple light sources a high power output may be achieved. The high power output of the present disclosure may be achieved without pushing the physical and material limits of a given light source with an increase in laser pump power (in the case of a light-sustained plasma source). For instance, high power outputs (e.g., greater than 30 W) are achievable through the aggregation, or combination, of multiple lower power sources (e.g., less than 10 W). The utilization of lower power for individual sources avoids high temperatures in the individual sources, thereby reducing the risk of damage to the source. Embodiments of the present disclosure are also directed to the control of a broadband output through the controlled combination of multiple smaller broadband sources. Such a configuration allows for shaping, spectral and temporal control of the output.

The generation of plasma within inert gas species is generally described in U.S. patent application Ser. No. 11/695,348, filed on Apr. 2, 2007; and U.S. patent application Ser. No. 11/395,523, filed on Mar. 31, 2006, which are incorporated herein in their entirety. Various plasma cell designs are described in U.S. patent application Ser. No. 13/647,680, filed on Oct. 9, 2012, which is incorporated herein by reference in the entirety. Plasma cell and plasma bulb designs are described in U.S. patent application Ser. No. 13/741,566, filed on Jan. 15, 2013, which is incorporated herein by reference in the entirety. The generation of plasma is also generally described in U.S. patent application Ser. No. 14/224,945, filed on Mar. 25, 2014, which is incorporated by reference herein in the entirety.

Figure 1A:
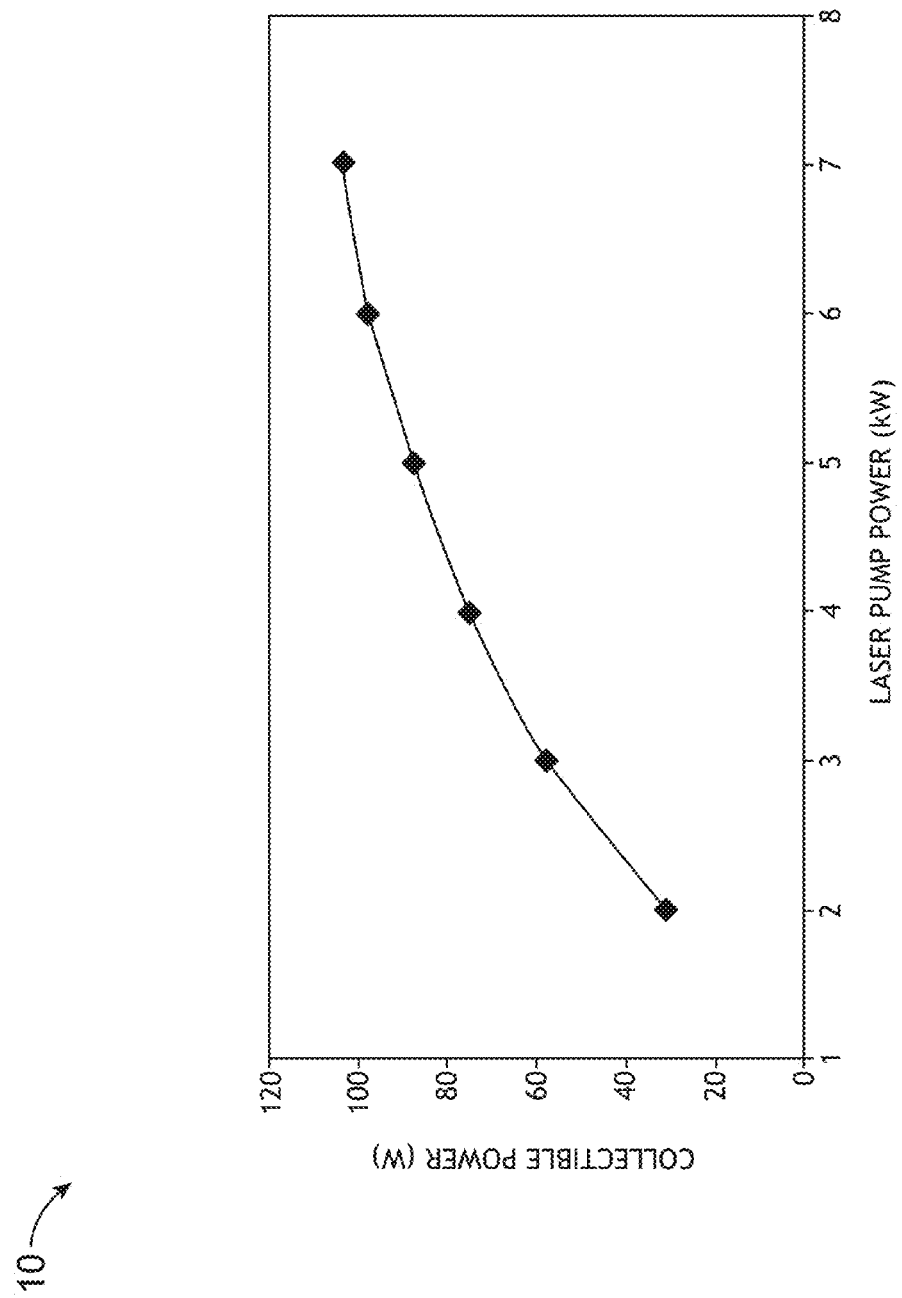
FIG. 1A is a graph of collectable power versus laser pump power in a light-sustained plasma light source, in accordance with one embodiment of the present disclosure.
Figure 1B:
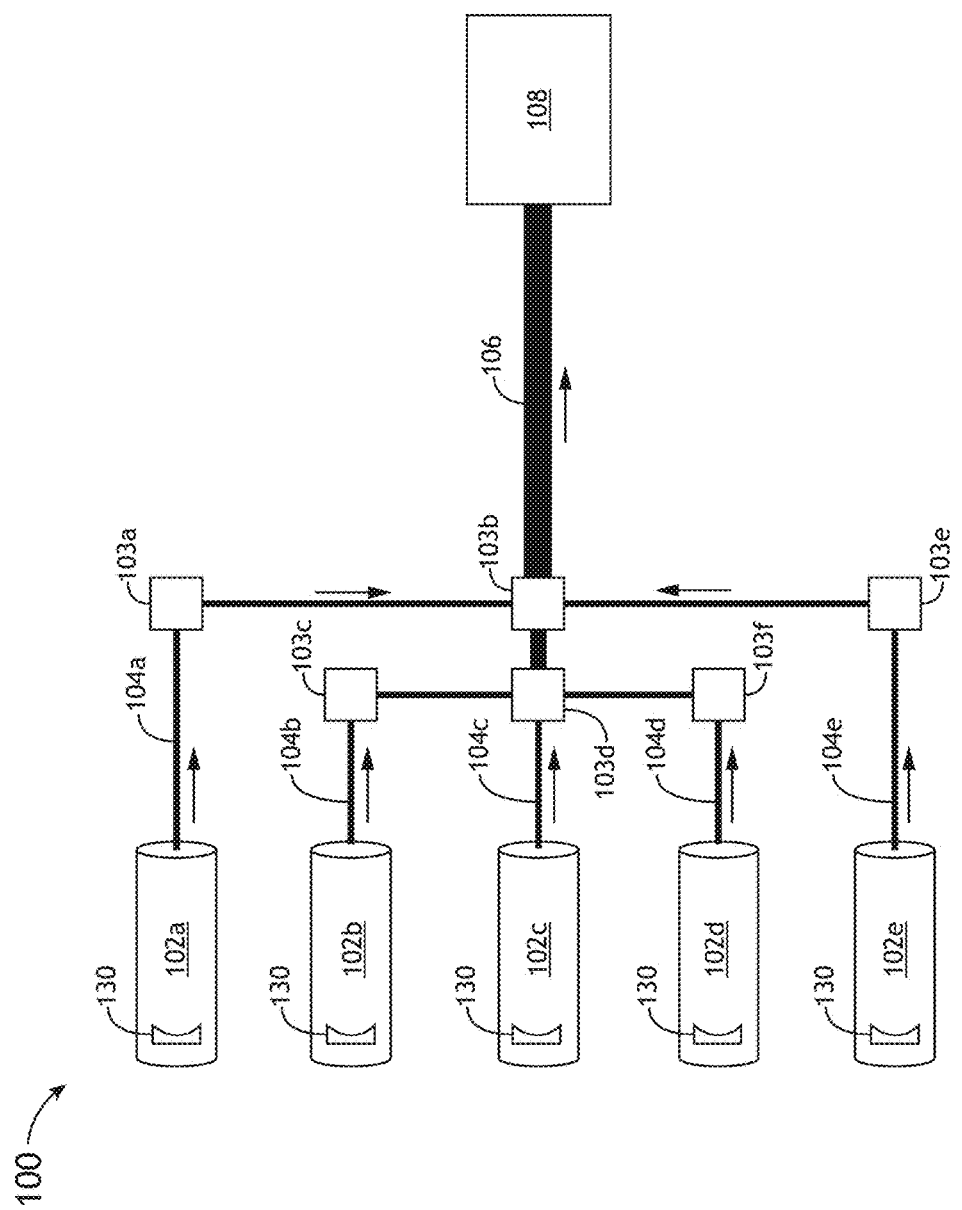
FIG. 1B is a high level conceptual view of a system for forming a high power broadband output, in accordance with one embodiment of the present disclosure.

FIG. 1B illustrates a conceptual view of a system 100 for generating a high radiance broadband output, in accordance with one embodiment of the present disclosure. In one embodiment, the system 100 includes a set of broadband sources 102a-102e. For example, as shown in FIG. 1B, the system 100 may include a first broadband source 102a, a second broadband source 102b, a third broadband source 102c, a fourth broadband source 102d, a fifth broadband source 102e and up to and including an Nth broadband source (not shown). As discussed further herein, the broadband sources 102a-102e of system 100 may include any broadband source known in the art of high power broadband light generation. In one embodiment, one or more of the broadband sources 102a-102e is a light-sustained plasma source. In another embodiment, one or more of the broadband sources 102a-102e is a discharge source, such as, but not limited to, an arc-lamp. In another embodiment, the broadband sources 102a-102e may include a combination of source types. For example, the set of broadband sources 102a-102e may include at least one plasma source and at least one discharge source.

In another embodiment, one or more of the broadband source 102a-102e include a reflector element 130 suitable for forming or shaping a broadband output 104a-104e. The reflector elements 130 may include any reflector element or reflector known in the art suitable for collecting broadband light within the given source 102a-102e and then forming an illumination output 104a-104e. For the purposes of the present disclosure, the reflector element disclosed herein may also be referred to as a reflector, a collector element or a collector.

In one embodiment, one or more of the reflector elements 130 include a parabolic reflector suitable for forming a collimated illumination output (e.g., collimated outputs 104a-104e) for the individual broadband source 102a-102e. In another embodiment, one or more of the reflector elements 130 include an ellipsoidal reflector suitable for focusing collected broadband radiation from the sources 102a-102e onto a downstream optical element. Embodiments related to the parabolic reflector and ellipsoidal reflector are described in greater detail further herein.

In another embodiment, the system 100 includes a set of optical elements 103a-103f arranged to combine the broadband light output 104a-104e of each of the set of broadband sources 102a-102e into an aggregated broadband light beam 106. It is noted herein that each of the optical elements 103a-103f may include, but are not limited to, multiple optical sub-elements, components or devices. The following description provides non-limiting examples and illustrations of one or more configurations of the set of optical elements 103a-103f.

In another embodiment, the aggregated broadband light beam 106 is delivered to one or more downstream optical elements 108 of the system 100.

Figure 1C:
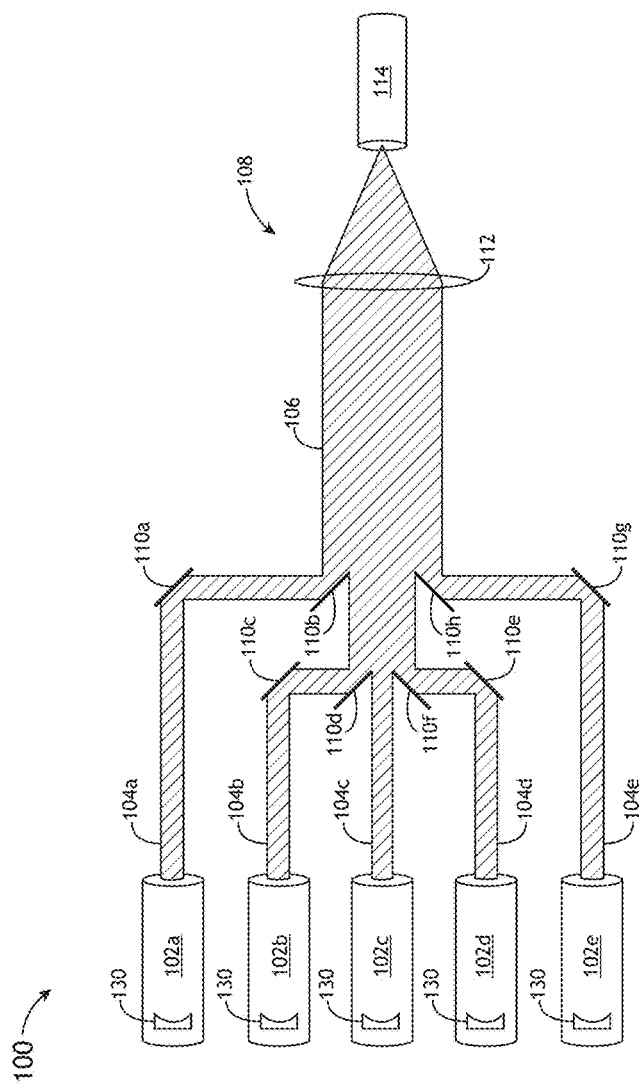
FIG. 1C is a simplified schematic view of a system for forming a high power broadband output, in accordance with one embodiment of the present disclosure.
Figure 1D:
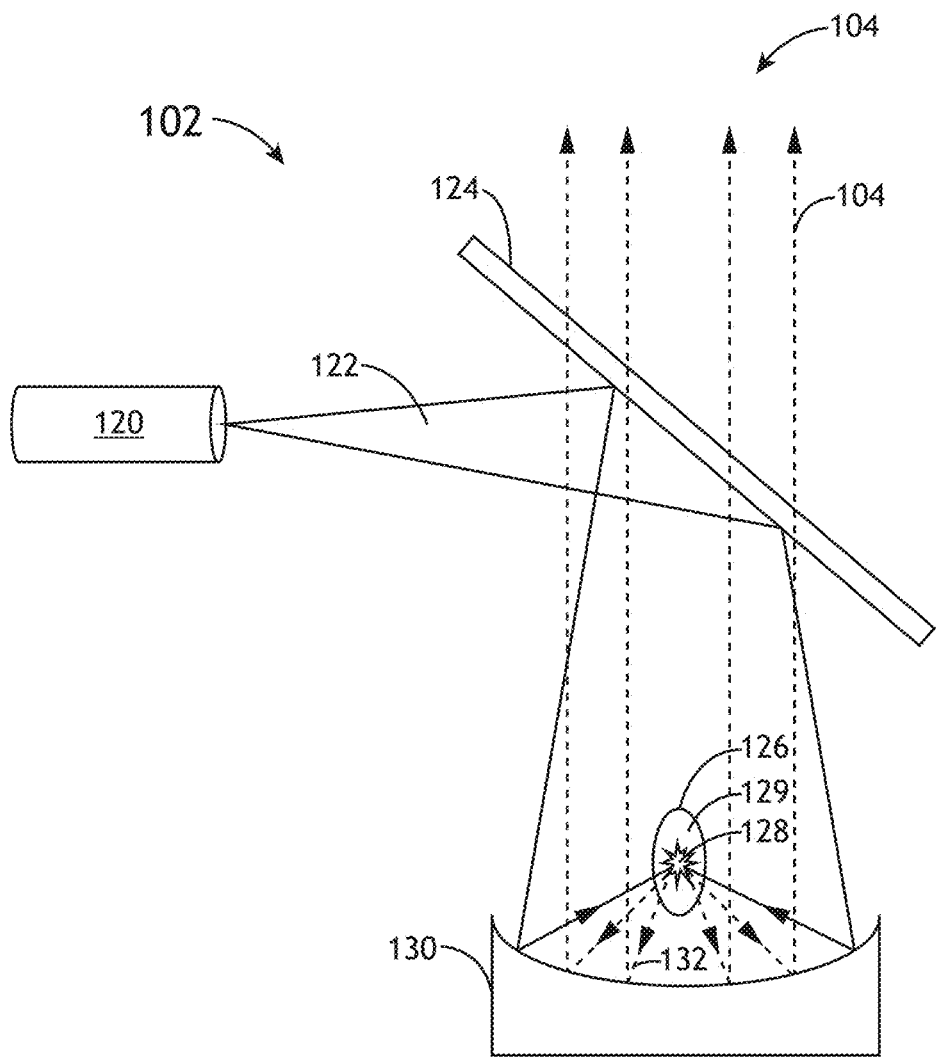
FIG. 1D is a schematic view of a light-sustained plasma light source with a parabolic reflector element, in accordance with one embodiment of the present disclosure.

FIGS. 1C and 1D illustrate simplified schematic views of system 100 equipped with a set of light-sustained plasma broadband sources 102a-102e, in accordance with one or more embodiments of the present disclosure. In one embodiment, the system 100 includes a set of light-sustained plasma light sources 102a-102e. It is noted that, while five light-sustained plasma light sources are depicted in FIG. 1C, such a configuration is not a limitation on the present disclosure and is provided merely for illustrative purposes. It is recognized herein that system 100 may include any number of light-sustained plasma light sources (or other broadband light sources).

A single light-sustained broadband source 102 suitable for implementation in system 100 is depicted in FIG. 1D, in accordance with one embodiment of the present disclosure. In one embodiment, the light-sustained plasma light source 102 includes a pumping source 120. The pumping source 120 (e.g., one or more lasers) of the given light-sustained plasma light source 102 is configured to generate pumping illumination 122 of a selected wavelength, or wavelength range, such as, but not limited to, infrared or visible radiation. The pumping illumination 122 is suitable for establishing and/or maintaining a plasma 128 within the given light source 102.

In one embodiment, the light-sustained plasma light source of FIG. 1D includes one or more gas containment structures 126 for generating and/or maintaining a plasma 128. It is noted herein the gas containment structure 126 of the present disclosure may include any gas containing structure known in the art of plasma-based light sources suitable for initiating and/or maintaining a plasma 128. For example, as described in greater detail further herein, the gas containment structure 126 may include, but is not limited to, a plasma bulb or a plasma cell (see FIGS. 1I-1J). By way of another example, as described in greater detail further herein, the gas containment structure 126 may include, but is not limited to, a larger scale bulb-less gas containment structure or chamber (see FIG. 1K).

In one embodiment, the gas containment structure 126 is configured to receive pump illumination 122 from the pumping source 120 in order to generate a plasma 128 within a plasma generation region of a volume of gas 129 contained within the gas containment structure 126. In this regard, one or more portions of the gas containment structure 126 are at least partially transparent to the illumination generated by the pumping source 120, allowing illumination 122 delivered by the pumping source 120 (e.g., delivered via fiber optic coupling or delivered via free space coupling) to be transmitted through the transparent portion of the gas containment structure 126 and into the gas volume 129 contained within the gas containment structure 126. In another embodiment, upon absorbing illumination from the pumping source 120, the plasma 128 emits broadband radiation (e.g., broadband IR, broadband visible, broadband UV, broadband DUV, broadband VUV and/or broadband EUV radiation). In another embodiment, one or more portions of the gas containment structure 126 are at least partially transparent to at least a portion of the broadband radiation emitted by the plasma 128. It is noted herein that the one or more portions of the gas containment structure 126 may be transparent to both illumination 122 from the pumping source 120 and broadband illumination 132 emitted by the plasma 128.

In one embodiment, the light-sustained plasma source 102 includes a parabolic reflector element 130. The parabolic reflector element 130 of a given light-sustained plasma source 102 is arranged to collect at least a portion of the broadband radiation 132 emitted by the plasma 128. In another embodiment, the parabolic reflector element 130 of a given light-sustained plasma source 102 is suitable for forming a collimated broadband radiation output 104. In this regard, the broadband radiation 132 from the plasma 128 is collected and reflected by the reflector element 130 such that the light reflected from the reflective surface of the reflector element 130 forms a collimated beam 104.

In one embodiment, pump illumination 122 from a given pumping source 120 may be directed to the reflector element 130 via selective mirror 124 (or a portion of a selective mirror 124). The selective mirror 124 may include any wavelength selective mirror known in the art. For example, the selective mirror 124 may include, but is not limited to, a dichroic mirror (e.g., hot mirror) suitable for reflecting all or a portion of the pumping illumination 122 and transmitting all or a portion of the generated broadband radiation 132 from the plasma 128.

Referring again to FIG. 1C, in one embodiment, the system 100 includes a set of optical elements 110a-110h configured to combine the collimated broadband outputs 104a-104e from the light-sustained plasma light sources 102a-102e into an aggregated beam 106. In one embodiment, the combination of the reflector elements 130 and the optical elements 110a-110h form an aggregated broadband beam 106. For example, as shown in FIG. 1C, a first pair of folding mirrors 110a, 110b and a second pair of folding mirrors 110c, 110d may direct a first collimated beam 104a and a second collimated beam 104b along a set of paths such that they are aggregated or combined with a third collimated beam 104c. By way of another example, a third pair of folding mirrors 110e, 110f and a fourth pair of folding mirrors 110g, 110h may direct a fourth collimated beam 104d and a fifth collimated beam 104e along a set of paths such that they are aggregated or combined with beams 104a-104c. It is further noted that the individual beams 104a-104e may be aggregated such that they do not overlap (or do not overlap significantly) when aggregated into the combined beam 106. Such a configuration may reduce loss in the system relative to a configuration where the beams 104a-104e overlap significantly.

It is noted herein that the system 100 is not limited to the particular optical configuration depicted in FIG. 1C, which is provided merely for illustrative purposes. It is recognized herein that the collimated beams 104a-104e may be combined into a spatially multiplexed or angularly multiplexed beam using a variety of optical configurations, which are all within the scope of the present disclosure.

In another embodiment, once the collimated and aggregated output beam 106 is formed it may be directed to additional downstream optical elements. In one embodiment, the system 100 includes any number of additional optical elements 108. In one embodiment, system 100 includes a focusing lens 112 (or mirror) configured to focus the aggregated beam 106. In another embodiment, the system 100 includes a homogenizer 114 or other light guide. In one embodiment, the focusing lens 112 may focus the aggregated beam 106 onto an entrance surface of homogenizer 114.

Figure 1E:
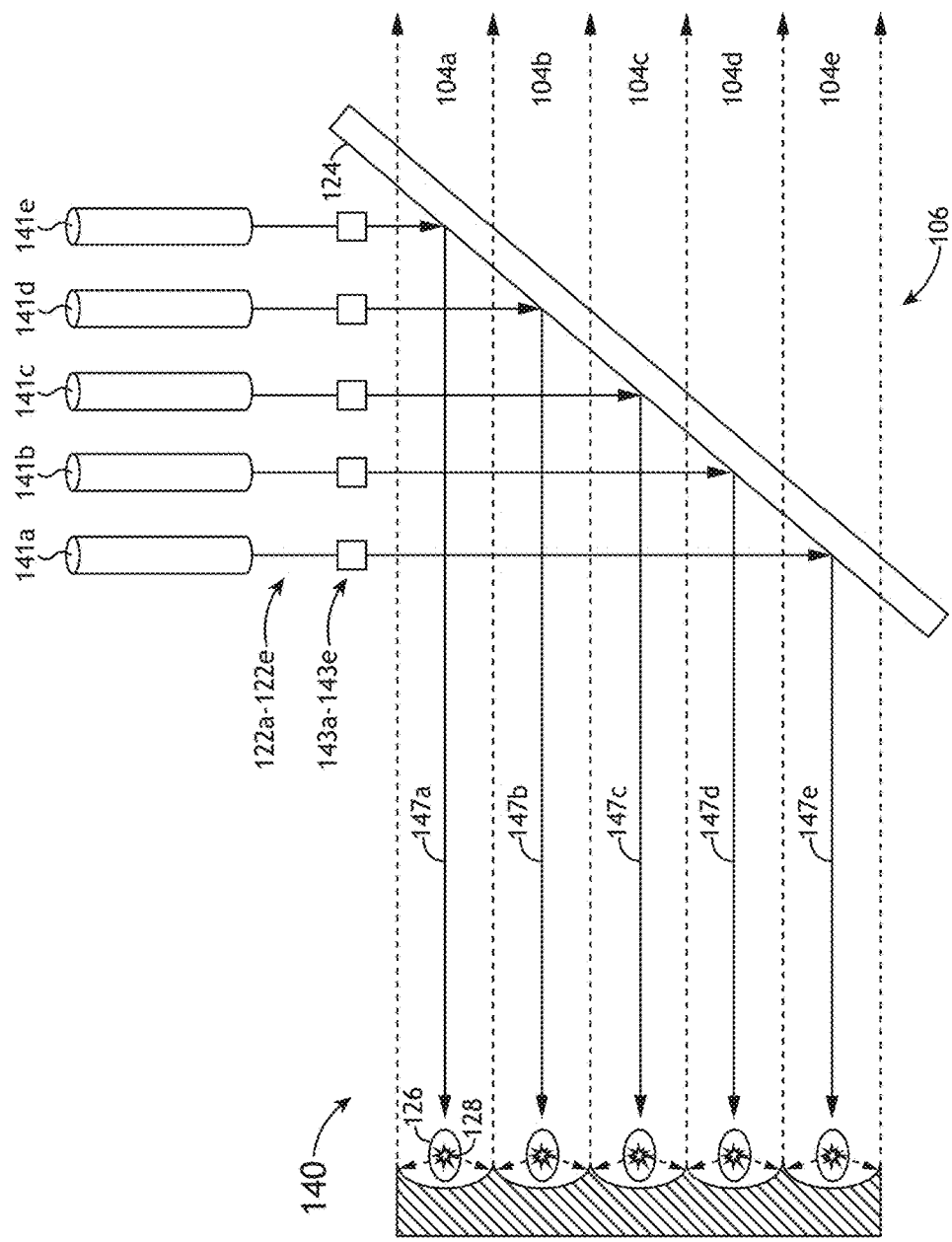
FIG. 1E is a schematic view of multiple light-sustained plasma light sources with parabolic reflector elements, in accordance with one embodiment of the present disclosure.

FIG. 1E illustrates a schematic view of multiple parabolic reflectors 130 of the light-sustained plasma sources 102a-102e, in accordance with one embodiment of the present disclosure.

In one embodiment, the pumping illumination 122a-122e is delivered to each gas containment structure 126 via a set of optical fibers 141a-141e. For example, each optical fiber 141a-141e may deliver pumping illumination 122a-122e to one of the gas containment structures 126. For instance, as shown in FIG. 1E, the pumping illumination 122a-122e is delivered from the optical fibers 141a-141e to the gas within each gas containment structure 126 via mirror 124 and the reflector elements 130. It is noted that for the purposes of clarity the illumination 122a-122e is depicted as a single line incident on the gas containment structure 126. It is recognized herein that this is not a limitation on system 100 and the illumination 122a-122e for each channel may impinge on the given parabolic reflector element 130, which may in turn collect the illumination and focus it into the given gas containment structure 126.

In one embodiment, a set of collimators 143a-143e may be placed at the output of the optical fibers 141a-141e. In this regard, each optical fiber (e.g., 141a) may be associated with its own collimator (e.g., 143a) so as to form a set of fiber-collimator pairs. In another embodiment, the fiber-collimator pairs may be arranged such that a set of collimated beams 147a-147e impinges on the parabolic reflectors 130. In another embodiment, the fiber-collimator pairs may be arranged such that the size of the collimated beams 147a-147e substantially matches the diameter of the corresponding reflector element 130. For example, in the case where the reflector elements are each 65 mm in diameter, the collimated beams 147a-147e may be formed such that they are approximately 65 mm in diameter.

In another embodiment, broadband light 132 emitted by each of the plasmas 128 is collected by the parabolic reflector elements 130. Then, each of the parabolic reflector elements 130 reflect a collimated beam 104a-104e. Provided the parabolic reflector elements 130 are spaced accordingly, the collimated beams 104a-104e may form a single aggregated broadband beam 106.

It is further noted that the parabolic reflectors 130a-130g of the present disclosure may be considered compact and constructed to have a size significantly smaller than reflector elements of previous single source systems. For example, the parabolic reflector elements 130 may each have a diameter in the range of 30 to 100 mm. In another embodiment, in the case of a parabolic reflector element of approximately 65 mm, a single selective mirror 124 having a length of approximately 200 to 350 mm may be used to direct illumination form the optical fibers 141a-141e to the reflector elements 130.

FIG. 1F illustrates a schematic view 145 of the collection path of system 100, in accordance with one embodiment of the present disclosure. As shown, in this embodiment, the system 100 includes an additional optical element 108. In one embodiment, the additional optical element 108 includes, but is not limited to, a focusing mirror 166. For example, the focusing mirror 166 may include, but is not limited to, an off-axis parabolic reflector 166. In one embodiment, the off-axis parabolic reflector 166 is configured to collectively focus the aggregated beam 106, made up of collimated beams 104a-104e, onto an entrance surface of the homogenizer 114.

Figure 1G:
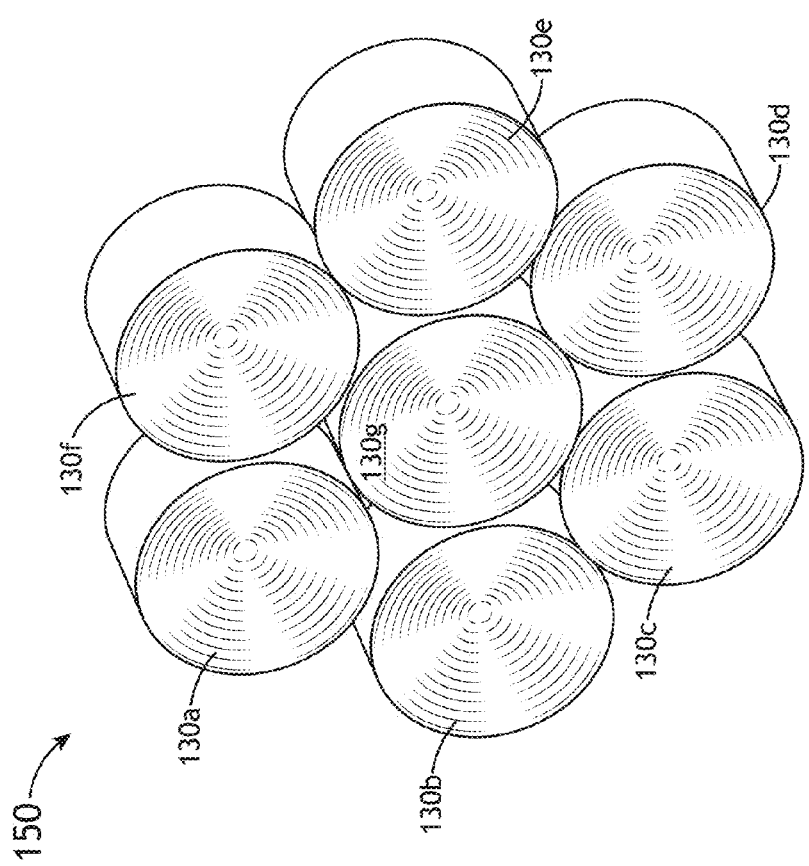
FIG. 1G is a schematic view of multiple parabolic reflector elements arranged in a hexagonal array, in accordance with one embodiment of the present disclosure.

FIG. 1G illustrates a schematic view 150 of a set of parabolic reflectors 130a-130g suitable for use in system 100, in accordance with one embodiment of the present disclosure. For example, as shown in FIG. 1G, the set of parabolic reflectors 130a-130g form a hexagonal array. In this regard, each reflector 130a-130g corresponds to the reflector used in one of the light-sustained plasma sources 102a-102e described previously herein. The close packing of the parabolic reflectors 130a-130g serves to provide a significantly aggregated beam 106 without additional optical folding, which is required in the embodiment of FIG. 1C. In another embodiment, although not shown in FIG. 1G, the fiber-collimator pairs (see FIG. 1E) may be arranged in a pattern that matches the hexagonal pattern (or other packing pattern) of the parabolic reflector elements 130a-130g. It is also noted herein that the number of channels of system 100 is not limited to five or seven depicted in FIGS. 1E-1G. Rather, it is pointed out that these configurations are provided merely for illustrative purpose and it is recognized herein that any number of channels may be implemented in system 100 and may be arranged in any packing geometry.

It is noted that the single light-sustained plasma sources (e.g., 102a-102e) of system 100 do not require continually increased pump power to achieve an overall higher output power of the system (due to the aggregation of beams 104a-104e). As a result, a higher pressure gas fill may be used within the gas containment structures 126 of system 100. In turn, the use of a higher pressure gas fill can reduce the pump load on the light sources 102a-102e even further. The reduction in required pump powers allows for a smaller fiber (e.g., 141a-141e), which allows for the production of a more compact plasma 126. In turn, broadband light from the compact plasma can be focused to a smaller spot size at the output of system 100, which provides better collection efficiency into the homogenizer 114 and, thus, increased collectible output power.

While much of this disclosure has focused on the aggregation of collimated beams from a set of parabolic reflectors 130 of a set of light-sustained light sources 102a-102e, such a configuration should not be interpreted as a limitation on the present disclosure. It is recognized herein that a number of geometrical and/or optical configurations are suitable for use in the context of the present discourse.

Figure 1H:
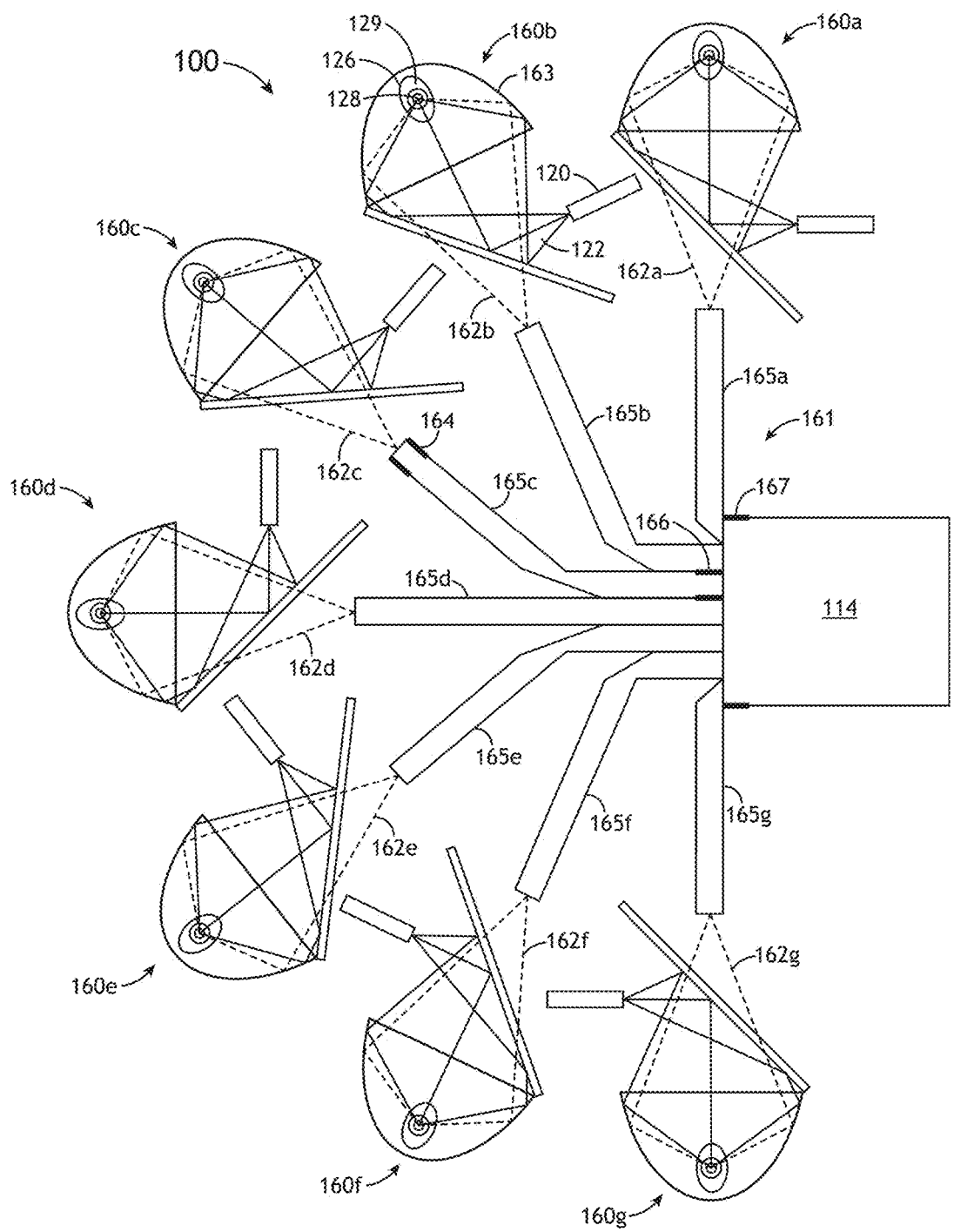
FIG. 1H is a simplified schematic view of a system for forming a high power broadband output, in accordance with one embodiment of the present disclosure

FIG. 1H illustrates system 100 equipped with a set of ellipsoid-shaped reflector elements 163, in accordance with one embodiment of the present disclosure. It is noted herein that the embodiments and components described previously herein with respect to the collimated reflectors 130 of FIGS. 1B-1G should be interpreted to extend to the ellipsoid-shaped reflector elements 163 of FIG. 1H unless otherwise noted.

In one embodiment, as depicted in FIG. 1H, each of the set of light-sustained plasma sources 160a-160g are equipped with an ellipsoid-shaped reflector element 163. The ellipsoid-shaped reflector elements 163 of the light-sustained plasma sources 160a-160g serve to focus pump illumination 122 from each of the pump sources 120 into each of the volumes of gas 129 contained within the gas containment structures 126. In another embodiment, the ellipsoid-shaped reflector elements 163 of the light-sustained plasma sources 160a-160g serve to collect broadband radiation 132 from each of the plasmas 128. In turn, each of the ellipsoid-shaped reflector elements 163 may focus the collected broadband light into the focused outputs 162a-162g and direct the focused light of each source 160a-160g to a selected downstream optical element or elements.

In another embodiment, the system 100 includes a light guiding network 161. In one embodiment, the light guiding network 161 includes one or more output light guides 114. In another embodiment, the light guiding 161 network includes a set of input light guides 165a-165g. In this regard, broadband light 162a-162g from the light-sustained light sources 160a-160g is transmitted along the input light guides 165a-165g and aggregated at the output light guide 114. In one embodiment, as shown in FIG. 1H, the broadband light 162a-162g from each light source 160a-160g is focused to the entrance of the associated input light guide 165a-165g. In another embodiment, light received by the output light guide 114 may be delivered to one or more downstream optical elements of system 100.

It is noted herein that the input light guides 165a-165g and/or the output light guide 114 may take on any general shape known in the art. For example, the input light guides 165a-165g and/or the output light guide 114 may include, but are not limited to, one or more bends and/or reflectors so as to allow the separation of the light-sustained sources 160a-160g (and the associated optics) in space.

In one embodiment, each of the light sources 160a-160g (or at least some of the light sources 160a-160g) is configured to produce a high temperature plasma 128. In another embodiment, the plasma 128 of each (or at least some) of the light sources 160a-160g may be optimized for the highest possible center radiance for the given light source 160a-160g.

In another embodiment, a collection aperture 167 is filled with the output light guide 114. In another embodiment, the entrance to the output light guide 114 is divided across a set of sub-apertures 164 and/or 166. In another embodiment, each of the sub-apertures 164, 166 are filled with the light guiding medium of the input light guides 165a-165g. It is noted herein that the sub-apertures may be implemented at the entrance 164 and/or the exit 166 of each secondary light guide 165a-165g.

In one embodiment, light may be collected from a selected portion of each light source 160a-160g via apertures 164 and/or 166 and then transmitted along the input light guides 165a-165g and combined at the collection aperture 167 and received by the output light guide 114. For example, light may be collected from the hottest portion of the plasma 128 of each light source 160a-160g via apertures 164 and/or 166 and then transmitted along the input light guides 165a-165g and combined at the collection aperture 167 and received by the output light guide 114. As a result, each light source 160a-160g may be optimized for high temperature at a selected volume (e.g., small center volume) of the given plasma 128, which allows for the collection of light from the brightest portion of the plasma 128 of each source 160a-160g. This selected light may then be combined to fill the collection aperture 167.

In another embodiment, the collection aperture 167 may be scaled through the addition of additional plasma light sources and corresponding input light guides, which deliver light to the collection aperture 167. It is noted herein that the collection aperture 167 may be scaled indefinitely without loss of radiance. In this regard, an arbitrary large collection aperture 167 may be filled by combining multiple plasma sources 160a-160g (and so on) without the loss of radiance.

The output light guide 114 and the input light guides 165a-165g may include any light guiding devices known in the art. In one embodiment, the output light guide 114 includes a homogenizer. In another embodiment, the output light guide 114 includes an optical fiber. In another embodiment, the output light guide 114 includes a hollow optical fiber. In one embodiment, the input light guides 165a-165g include one or more homogenizers. In another embodiment, the input light guides 165a-165g include one or more optical fibers. In another embodiment, the input light guides 165a-165g include one or more hollow optical fibers.

The input light guides 165a-165g may be optically coupled to the output light guide 114 in any manner known in the art. In one embodiment, in the case where the input light guides 165a-165g are optical fibers, each optical fiber light guide 165a-165g may be permanently attached to the entrance of the output light guide 114. In this embodiment, a dedicated sub-aperture or sub-apertures 164/166 is not necessary.

In one embodiment, in the case where the input light guides 165a-165g are solid light guides (e.g., homogenizers), solid input light guide 165a-165g may be permanently attached to the entrance of the output light guide 114.

In one embodiment, the input light guides 165a-165g are coupled to the output light guide 114 through the mechanical alignment of the output of the input light guides 165a-165g with the entrance surface of the output light guide 114. In another embodiment, the input light guides 165a-165g are coupled to the output light guide 114 via a set of discrete optics, such as, but not limited to, a set of mirrors and/or lenses configured to couple the output of the input light guides 165a-165g with the entrance surface of the output light guide 114. In another embodiment, the input light guides 165a-165g and the output light guide 114 may form an integrated fused light guide assembly. In another embodiment, the input light guides 165a-165g are coupled to the output light guide 114 via a fly's eye input to the output light guide 114.

It is noted herein that the output light guide 114 (e.g., homogenizer) can take on any shape known in the art. For example, the output light guide 114 may have a complex shape. In another embodiment, the output light guide 114 may include two or more light guides (e.g., two or more homogenizers). Such a configuration allows both NA and spatially independent shaping of the illumination field.

In one embodiment, the collection aperture 167 may be manipulated during operation of one or more of the light sources 160a-160g by shifting of one or more of the sub-apertures 164, 166 of a given light guide 160a-160g. In another embodiment, the collection aperture 167 may be manipulated during operation of one or more of the light sources 102a-102g by turning one or more of the individual sources 160a-160g ON or OFF.

In one embodiment, the light emitted by the two or more of the light sources 160a-160g may have different characteristics. For example, light emitted by two or more of the light sources 160a-160g may have different spectral characteristics, different temporal profiles or different numerical apertures (NAs).

In one embodiment, the light sources 160a-160g may be optimized for different spectral ranges. For example, each of the light sources 160a-160g (or at least some of the light sources) may be optimized for different spectral regions of broadband light emission. In turn, the broadband light output 162a-162g of the differently optimized emissions 162a-162g may be combined in collection aperture 167 to form an output beam having a spectral composition consisting of a composite of the spectral contributions of the individual light sources 160a-160g.

In another embodiment, the individual broadband outputs 162a-162g may be coupled within the sub-apertures 164, 166 at different NA values. In this regard, light 162a-162g from the individual light sources 160a-160g can be coupled to the collection aperture 167 at different angles and NAs, which allows for different spectral and power distributions for different NAs in the collection aperture 167.

In another embodiment, the individual light sources 160a-160g may be individually or collectively temporally modulated. For example, at least some of the light sources 160a-160g may include, but are not limited to, pulsed light sources. In this case, a large number of pulsed sources can be combined to produce a pseudo-CW source or a source with a selected temporal variation of light intensity.

In another embodiment, the system 100 may include one or more delay lines or active modulators. For example, one or more delay lines or active modulators may be used to control/modify temporal characteristics of the light from the light sources 160a-160g in the sub-apertures. For instance, one or more delay lines or active modulators may be placed at the entrance or the exit of one or more of the light guides 165a-165g. In another instance, one or more delay lines or active modulators may be placed along one or more of the paths defined by the light guides 165a-165g.

In another embodiment, in the case where at least some of the light sources 160a-160g are pulsed light sources, two or more of the input light guides 165a-165g may have different lengths in order to temporally distribute pulses from the light sources 160a-160g.

In another embodiment, the spatial pattern of the light entering the output light guide 114 (and supplied to downstream optics) may be controlled by re-arranging the supply of light from one or more light sources 160a-160g in the sub-apertures 164, 166.

In another embodiment, the numerical aperture of the light entering the output light guide 114 (and supplied to downstream optics) may be controlled by controlling the orientation of the combining optics used to combine the input light guides 165a-165g and the output input medium 114.

While the embodiment of FIG. 1H has been generally described in the context of a plasma-based light sources utilizing ellipsoid reflector elements, such a configuration is not a limitation on the present disclosure. It is noted herein that the light sources 160a-160g of system 100 may include any type of broadband or narrowband light sources. For example, the individual light sources 160a-160g of system 100 may include any combination of a light-sustained plasma source, an arc lamp, LED, laser, incandescent lamp and the like. Moreover, any combination of light sources being of the same type, but having different characteristics (e.g., spectral range, temporal properties and the like), may be used in the light sources 160a-160g of system 100.

In addition, the light sources 160a-160g may implement any optical reflector element known in the art of light collection. In this regard, the light sources 160a-160g are not limited to the ellipsoid reflector element of FIG. 1H. For example, the collection geometry of the light sources 160a-160g may include, but is not limited to, a parabolic reflector element, an ellipsoid reflector element, a spherical reflector element, a condenser element and the like.

Figure 1J:
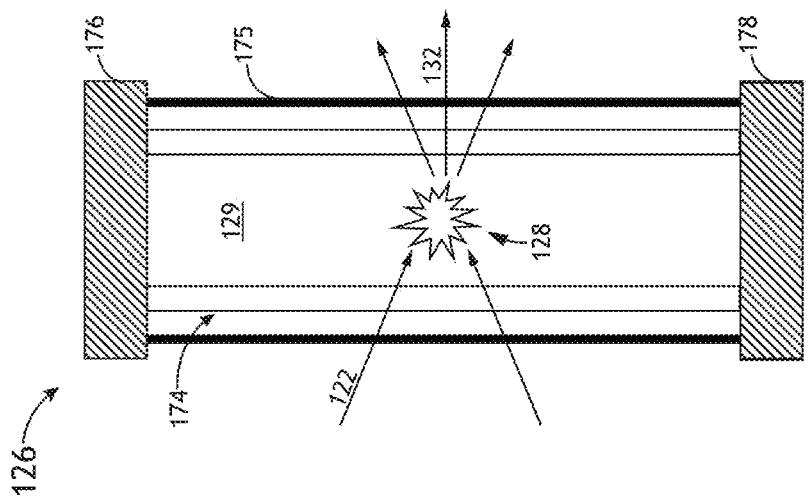
FIG. 1J is a schematic view of a plasma cell for use in the system for forming a high power broadband output, in accordance with one embodiment of the present disclosure.
Figure 1I:
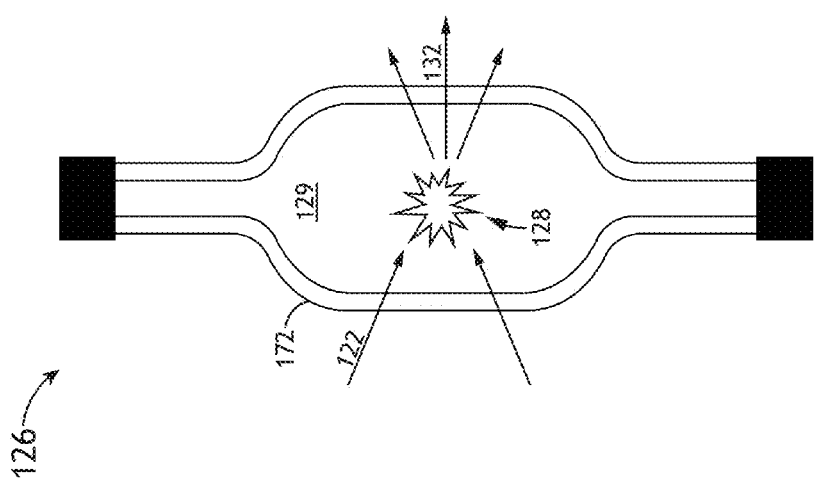
FIG. 1I is a schematic view of a plasma bulb for use in the system for forming a high power broadband output, in accordance with one embodiment of the present disclosure.
Figure 1K:
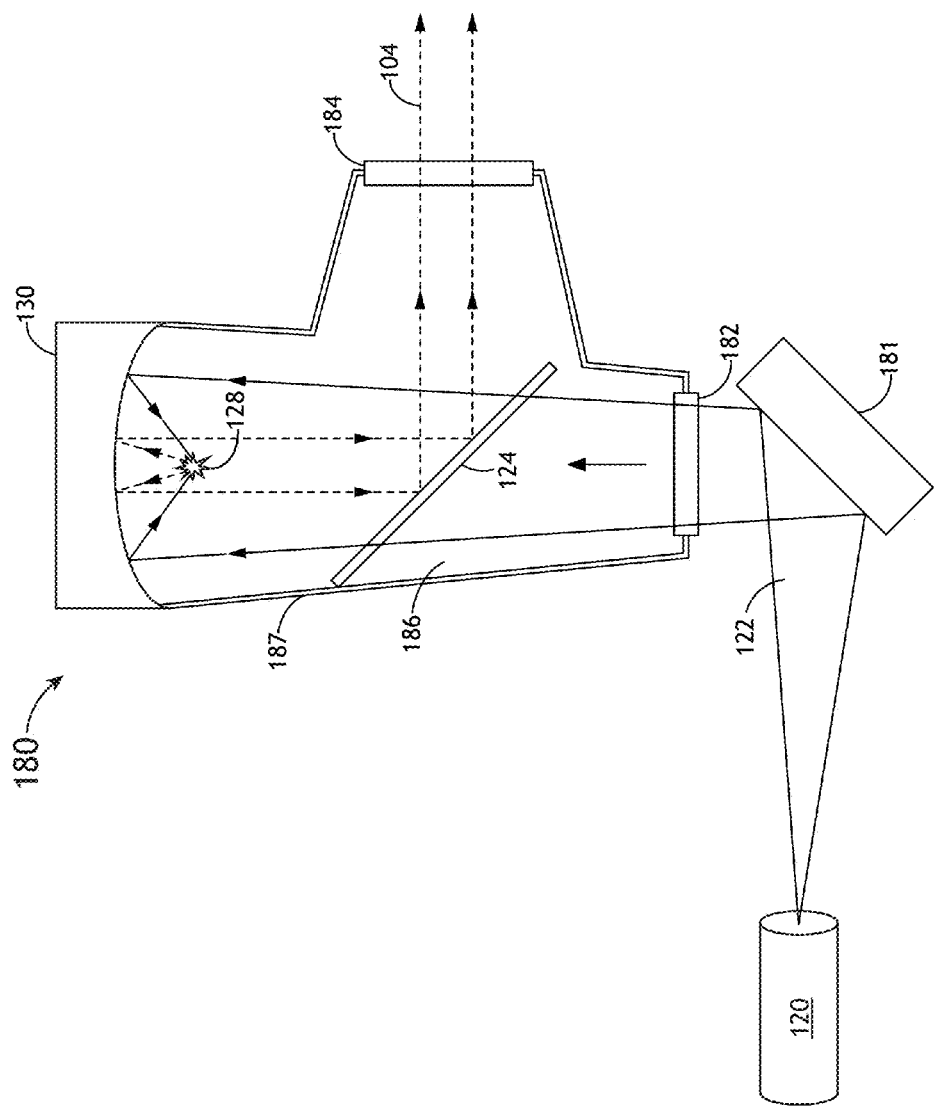
FIG. 1K is a schematic view of a bulb-less plasma chamber for use in the system for forming a high power broadband output, in accordance with one embodiment of the present disclosure.

FIGS. 1I through 1K illustrate various gas containment structures suitable for use in the light-sustained plasma light sources 102a-102e or 160a-160g of the present disclosure, in accordance with one or more embodiments of the present disclosure.

In one embodiment, as shown in FIG. 1I, the gas containment structure 126 of the present disclosure includes a plasma bulb 172. The plasma bulb 172 is suitable for initiating and/or maintaining plasma 128. The implementation of a plasma bulb is generally described in U.S. patent application Ser. No. 11/695,348, filed on Apr. 2, 2007; U.S. patent application Ser. No. 11/395,523, filed on Mar. 31, 2006; and U.S. patent application Ser. No. 13/647,680, filed on Oct. 9, 2012, which are each incorporated previously herein by reference in the entirety.

In another embodiment, as shown in FIG. 1J, the gas containment structure 126 of the present disclosure includes a plasma cell having a transmission element 174. The transmission element 174 of the plasma cell is suitable for initiating and/or maintaining plasma 128. In one embodiment, the transmission element 174 is suited for transmitting light 122 from the pumping source 120 into the gas 129 and further suited for transmitting broadband radiation 132 from the plasma 128 to downstream optical elements In another embodiment, the transmission element 174 of the plasma cell may include one or more openings (e.g., top and bottom openings). In another embodiment, one or more flanges 176, 178 are disposed at the one or more openings of the transmission element 174. In one embodiment, the one or more flanges 176, 178 are configured to enclose the internal volume of the transmission element 174 so as to contain a volume of gas 129 within the body of the transmission element 174. In one embodiment, the one or more openings may be located at one or more end portions of the transmission element 174. For example, as shown in FIG. 1J, a first opening may be located at a first end portion (e.g., top portion) of the transmission element 174, while a second opening may be located at a second end portion (e.g., bottom portion), opposite of the first end portion, of the transmission element 174. In another embodiment, the one or more flanges 176, 178 are arranged to terminate the transmission element 174 at the one or more end portions of the transmission element 174, as shown in FIG. 1J. For example, a first flange 176 may be positioned to terminate the transmission element 174 at the first opening, while the second flange 178 may be positioned to terminate the transmission element 174 at the second opening. In another embodiment, the first opening and the second opening are in fluidic communication with one another such that the internal volume of the transmission element 174 is continuous from the first opening to the second opening. In another embodiment, although not shown, the plasma cell includes one or more seals. In one embodiment, the seals are configured to provide a seal between the body of the transmission element 174 and the one or more flanges 176, 178. The seals of the plasma cell may include any seals known in the art. For example, the seals may include, but are not limited to, a brazing, an elastic seal, an O-ring, a C-ring, a metal seal and the like. In another embodiment, the top flange 176 and bottom flange 178 may be mechanically coupled via one or more connecting rods 175, thereby sealing the transmission element 174. The generation of plasma in a flanged plasma cell is also described in U.S. patent application Ser. No. 14/231,196, filed on Mar. 31, 2014, which is incorporated by reference herein in the entirety.

FIG. 1K illustrates a bulb-less light-sustained plasma light source 180, in accordance with one or more embodiments of the present disclosure. While much of the present disclosure has focused on the implementation of the various light sources of system 100 in the context of a plasma bulb (see FIG. 1I) or plasma cell (see FIG. 1J), this is not a limitation on the present disclosure. The bulb-less light source 180 is configured to establish and maintain plasma 128 within a gas 186 contained in a gas containment structure 187 (e.g., chamber 187). For example, as shown in FIG. 1K, a plasma 128 may be established and maintained in the gas 186 contained within the volume defined by the gas containment structure 187 (e.g., chamber) and/or the reflector element 130.

In another embodiment, the gas containment structure 187 is operably coupled to the reflector element 130. For example, as shown in FIG. 1K, the reflector element 130 is disposed on an upper portion of containment structure 187. By way of another example, although not shown, the reflector element 130 may be disposed inside of the gas containment structure 187. It is noted herein that the present disclosure is not limited to the above description or the depiction of source 180 in FIG. 1K as it is contemplated herein that source 180 may encompass a number of bulb-less configurations suitable for initiating and/or maintaining a plasma 128 in accordance with the present invention. The generation of plasma in a bulb-less light source is generally described in U.S. patent application Ser. No. 14/224,945, filed on Mar. 25, 2014, which is incorporated above in the entirety. A bulb-less laser sustained plasma light source is also generally described in U.S. patent application Ser. No. 12/787,827, filed on May 26, 2010, which is incorporated herein by reference in the entirety.

It is noted herein that the various embodiments and examples of the light sources described previously herein with respect to FIGS. 1B-1J should be interpreted to extend to the bulb-less source 180 of FIG. 1K.

In one embodiment, the source 180 includes one or more transparent portions 182, 184. For example, the one or more transparent portions 182, 184 may include, but are not limited to, windows 182, 184. In one embodiment, the source 180 includes an input window 182 for receiving pumping radiation 122 from the pumping source 120. In another embodiment, the source 180 includes an output window 184 for transmitting broadband illumination 104 from the plasma 128 to downstream optical components (e.g., homogenizer 114).

In one embodiment, as shown in FIG. 1K, the reflector element 130 is a parabolic reflector element 130. In this regard, the broadband light 104 emitted by the source 180 is collimated by the parabolic reflector 130. In this regard, the collimated broadband light 104 emitted by the source 180 is directed by the parabolic-shaped reflector element onto one or more downstream optics. For example, the collimated broadband light 104 from source 180 may be directed to one of the folding mirrors (e.g., 110a-110g as shown in FIG. 1C). By way of another example, the collimated broadband light 104 of source 180 may be directed to a focusing mirror (e.g., off-axis parabolic reflector 146 of FIG. 1F). In another embodiment, although not shown in FIG. 1K, the reflector element 130 is an ellipsoid-shaped reflector element, such as the reflector 163 depicted in FIG. 1H. In this regard, the broadband light 104 emitted by the source 180 is focused by the ellipsoid-shaped reflector element onto one or more downstream optics. For example, broadband light 104 from an ellipsoid-shaped reflector element 130 of source 180 may be focused to entrance surface of one of the input light guides 165a-165g shown in FIG. 1H.

It is noted herein that the present disclosure is not limited to the particular configuration of source 180 as depicted in FIG. 1K. It is recognized herein that there are a variety of equivalent configurations of source 180 (e.g., reflector element 130 arranged at bottom of gas containment structure 187) that are within the scope of the present disclosure.

Referring generally to FIGS. 1B-1K, in one embodiment, the gas containment structure 126 may contain any selected gas (e.g., argon, xenon, mercury or the like) known in the art suitable for generating plasma 128 upon absorption of suitable illumination. In one embodiment, focusing illumination 122 or directing collimated illumination 123 from the pump source 120 into the volume of gas 129 causes energy to be absorbed through one or more selected absorption lines of the gas or plasma 128 within the gas containment structure 126 (e.g., within plasma bulb or plasma cell), thereby "pumping" the gas species in order to generate or sustain a plasma 128. In another embodiment, although not shown, the gas containment structure 126 may include a set of electrodes for initiating the plasma 128 within the internal volume of the gas containment structure 126, whereby pumping radiation 122 from the pump source 120 maintains the plasma 128 after ignition by the electrodes.

It is contemplated herein that the system 100 may be utilized to initiate and/or sustain plasma 128 in a variety of gas environments. In one embodiment, the gas used to initiate and/or maintain plasma 128 may include an inert gas (e.g., noble gas or non-noble gas) or a non-inert gas (e.g., mercury). In another embodiment, the gas 129 used to initiate and/or maintain plasma 128 may include a mixture of gases (e.g., mixture of inert gases, mixture of inert gas with non-inert gas or a mixture of non-inert gases). For example, it is recognized herein that the volume of gas 129 used to generate a plasma 128 may include argon. For instance, the gas 129 may include a substantially pure argon gas held at pressure in excess of 5 atm (e.g., 20-50 atm). In another instance, the gas 129 may include a substantially pure krypton gas held at pressure in excess of 5 atm (e.g., 20-50 atm). In another instance, the gas 129 may include a mixture of argon gas with an additional gas.

It is further noted that the system 100 may be implemented with a number of gases. For example, gases suitable for implementation in the system 100 of the present disclosure may include, but are not limited, to Xe, Ar, Ne, Kr, He, $N_2$, $H_2O$, $O_2$, $H_2$, $D_2$, $F_2$, $CH_4$, one or more metal halides, a halogen, Hg, Cd, Zn, Sn, Ga, Fe, Li, Na, Ar:Xe, ArHg, KrHg, XeHg, and the like. In a general sense, system 100 of the present disclosure should be interpreted to extend to any architecture suitable for light-sustained plasma generation and should further be interpreted to extend to any type of gas suitable for sustaining a plasma within a plasma cell.

The transparent portion (e.g., bulb or transmission element of plasma cell) of the gas containment structure 126 of system 100 may be formed from any material known in the art that is at least partially transparent to radiation generated by plasma 128. In one embodiment, the transparent portion of the gas containment structure 126 may be formed from any material known in the art that is at least partially transparent to VUV radiation generated by plasma 128. In another embodiment, the transparent portion of gas containment structure 126 may be formed from any material known in the art that is at least partially transparent to DUV radiation generated by plasma 128. In another embodiment, the transparent portion of gas containment structure 126 may be formed from any material known in the art that is at least partially transparent to EUV light generated by plasma 128. In another embodiment, the transparent portion of gas containment structure 126 may be formed from any material known in the art that is at least partially transparent to UV light generated by plasma 128. In another embodiment, the transparent portion of gas containment structure 126 may be formed from any material known in the art at least partially transparent to visible light generated by plasma 128.

In another embodiment, transparent portion of gas containment structure 126 may be formed from any material known in the art transparent to the pumping radiation 122 (e.g., IR radiation) from the pump source 120. In another embodiment, the transparent portion of gas containment structure 126 may be formed from any material known in the art transparent to both radiation 122 from the pump source 120 (e.g., IR source) and radiation 132 (e.g., VUV radiation, DUV radiation, EUV radiation, UV radiation and/or visible radiation) emitted by the plasma 128 contained within the volume of transparent portion of gas containment structure 126. In some embodiments, the transparent portion of gas containment structure 126 may be formed from a low-OH content fused silica glass material. In other embodiments, the transparent portion of gas containment structure 126 may be formed from high-OH content fused silica glass material. For example, the transparent portion of gas containment structure 126 may include, but is not limited to, SUPRASIL 1, SUPRASIL 2, SUPRASIL 300, SUPRASIL 310, HERALUX PLUS, HERALUX-VUV, and the like. In other embodiments, the transparent portion of gas containment structure 126 may include, but is not limited to, calcium fluoride ($CaF_2$), magnesium fluoride ($MgF_2$), lithium fluoride ($LiF_2$), crystalline quartz and sapphire. It is noted herein that materials such as, but not limited to, $CaF_2$, $MgF_2$, crystalline quartz and sapphire provide transparency to short-wavelength radiation (e.g., $\lambda$<190 nm). Various glasses suitable for implementation in the transparent portion of gas containment structure 126 of the present disclosure are discussed in detail in A. Schreiber et al., *Radiation Resistance of Quartz Glass for VUV Discharge Lamps*, J. Phys. D: Appl. Phys. 38 (2005), 3242-3250, which is incorporated herein by reference in the entirety.

The transparent portion (e.g., bulb or transmission element of plasma cell) of the gas containment structure 126 may take on any shape known in the art. In the case where the gas containment structure 126 includes a plasma cell having a transmission element 174, as shown in FIG. 1J, the transmission element 174 may have a cylindrical shape. In another embodiment, although not shown, the transmission element 174 may have a spherical or ellipsoidal shape. In another embodiment, although not shown, the transmission element 174 may have a composite shape. For example, the shape of the transmission element 174 may consist of a combination of two or more shapes. For instance, the shape of the transmission element 174 may consist of a spherical or ellipsoidal center portion, arranged to contain the plasma 128, and one or more cylindrical portions extending above and/or below the spherical or ellipsoidal center portion, whereby the one or more cylindrical portions are coupled to the one or more flanges 176, 178. In the case where the transmission element 174 is cylindrically shaped, as shown in FIG. 1J, the one or more openings of the transmission element 174 may be located at the end portions of the cylindrically shaped transmission element 174. In this regard, the transmission element 174 takes the form of a hollow cylinder, whereby a channel extends from the first opening (top opening) to the second opening (bottom opening). In another embodiment, the first flange 176 and the second flange 178 together with the wall(s) of the transmission element 174 serve to contain the volume of gas 129 within the channel of the transmission element 174. It is recognized herein that this arrangement may be extended to a variety of transmission element 174 shapes, as described previously herein.

In settings where the gas containment structure 126 includes a plasma bulb 172, as in FIG. 1I, the plasma bulb 172 may also take on any shape known in the art. In one embodiment, the plasma bulb 172 may have a cylindrical shape. In another embodiment, the plasma bulb 172 may have a spherical or ellipsoidal shape. In another embodiment, the plasma bulb may have a composite shape. For example, the shape of the plasma bulb 172 may consist of a combination of two or more shapes. For instance, the shape of the plasma bulb 172 may consist of a spherical or ellipsoidal center portion, arranged to contain the plasma 128, and one or more cylindrical portions extending above and/or below the spherical or ellipsoidal center portion.

In another embodiment, the various reflector elements 130 (or 163) of the present disclosure are suitable for collecting broadband illumination 132 (e.g., VUV radiation, DUV radiation, EUV radiation, UV radiation and/or visible radiation) emitted by plasma 128 and direct the broadband illumination to one or more additional optical elements, as described throughout the present disclosure. For example, the one or more of the reflector elements 130, 163 may collect at least one of VUV broadband radiation, DUV radiation, EUV radiation, UV radiation or visible radiation emitted by plasma 128 and direct the broadband illumination 132 to one or more downstream optical elements. In this regard, the gas containment structure 126 may deliver VUV radiation, DUV radiation, EUV radiation, UV radiation and/or visible radiation to downstream optical elements of any optical characterization system known in the art, such as, but not limited to, an inspection tool or a metrology tool. It is noted herein the gas containment structure 126 of system 100 may emit useful radiation in a variety of spectral ranges including, but not limited to, VUV radiation, DUV radiation, EUV radiation, UV radiation, and/or visible radiation.

In another embodiment, the one or more pump sources 120 of system 100 may include one or more lasers. In a general sense, the pump sources 120 may include any laser system known in the art. For instance, the pump sources 120 may include any laser system known in the art capable of emitting radiation in the infrared, visible or ultraviolet portions of the electromagnetic spectrum. In one embodiment, the pump sources 120 may include a laser system configured to emit continuous wave (CW) laser radiation. For example, the pump sources 120 may include one or more CW infrared laser sources. For instance, in settings where the gas within the gas containment structure 126 is or includes argon, the pump sources 120 may include a CW laser (e.g., fiber laser or disc Yb laser) configured to emit radiation at 1069 nm. It is noted that this wavelength fits to a 1068 nm absorption line in argon and, as such, is particularly useful for pumping argon gas. It is noted herein that the above description of a CW laser is not limiting and any laser known in the art may be implemented in the context of the present disclosure.

In another embodiment, the pump sources 120 may include one or more diode lasers. For example, the pump sources 120 may include one or more diode lasers emitting radiation at a wavelength corresponding with any one or more absorption lines of the species of the gas contained within the gas containment structure 126. In a general sense, a diode laser of the one or more pump sources 120 may be selected for implementation such that the wavelength of the diode laser is tuned to any absorption line of any plasma (e.g., ionic transition line) or any absorption line of the plasma-producing gas (e.g., highly excited neutral transition line) known in the art. As such, the choice of a given diode laser (or set of diode lasers) may depend on the type of gas contained within the gas containment structure 126 of system 100.

In another embodiment, one or more of the pump sources 120 may include an ion laser. For example, the pump sources 120 may include any noble gas ion laser known in the art. For instance, in the case of an argon-based plasma, the pump sources 120 used to pump argon ions may include an Ar+ laser.

In another embodiment, the pump sources 120 may include one or more frequency converted laser systems. For example, the pump sources 120 may include a Nd:YAG or Nd:YLF laser having a power level exceeding 100 watts. In another embodiment, the pump sources 120 may include a broadband laser. In another embodiment, the illumination source may include a laser system configured to emit modulated laser radiation or pulsed laser radiation.

In another embodiment, the pump sources 120 may include one or more lasers configured to provide laser light at substantially a constant power to the plasma 128. In another embodiment, the pump sources 120 may include one or more modulated lasers configured to provide modulated laser light to the plasma 128. In another embodiment, the pump sources 120 may include one or more pulsed lasers configured to provide pulsed laser light to the plasma.

In another embodiment, the pump sources 120 may include one or more non-laser sources. In a general sense, the pump source 120 may include any non-laser light source known in the art. For instance, the pump sources 120 may include any non-laser system known in the art capable of emitting radiation discretely or continuously in the infrared, visible or ultraviolet portions of the electromagnetic spectrum.

In another embodiment, a single pump source may include two or more light sources. In one embodiment, a single pump source 120 may include or more lasers. For example, a single pump source 120 (or illumination source) may include multiple diode lasers. By way of another example, a single pump source 120 may include multiple CW lasers. In a further embodiment, each of the two or more lasers may emit laser radiation tuned to a different absorption line of the gas or plasma within the gas containment structure 126 of system 100.

Figure 2B:
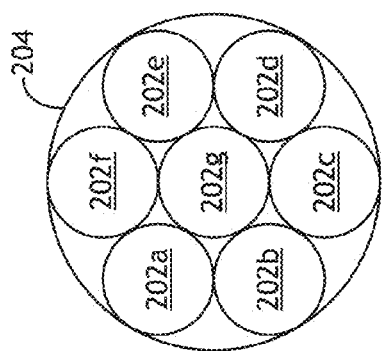
FIG. 2B is a cross-sectional view of a fiber bundle for use in the system for forming a high power broadband output, in accordance with one embodiment of the present disclosure.
Figure 2A:
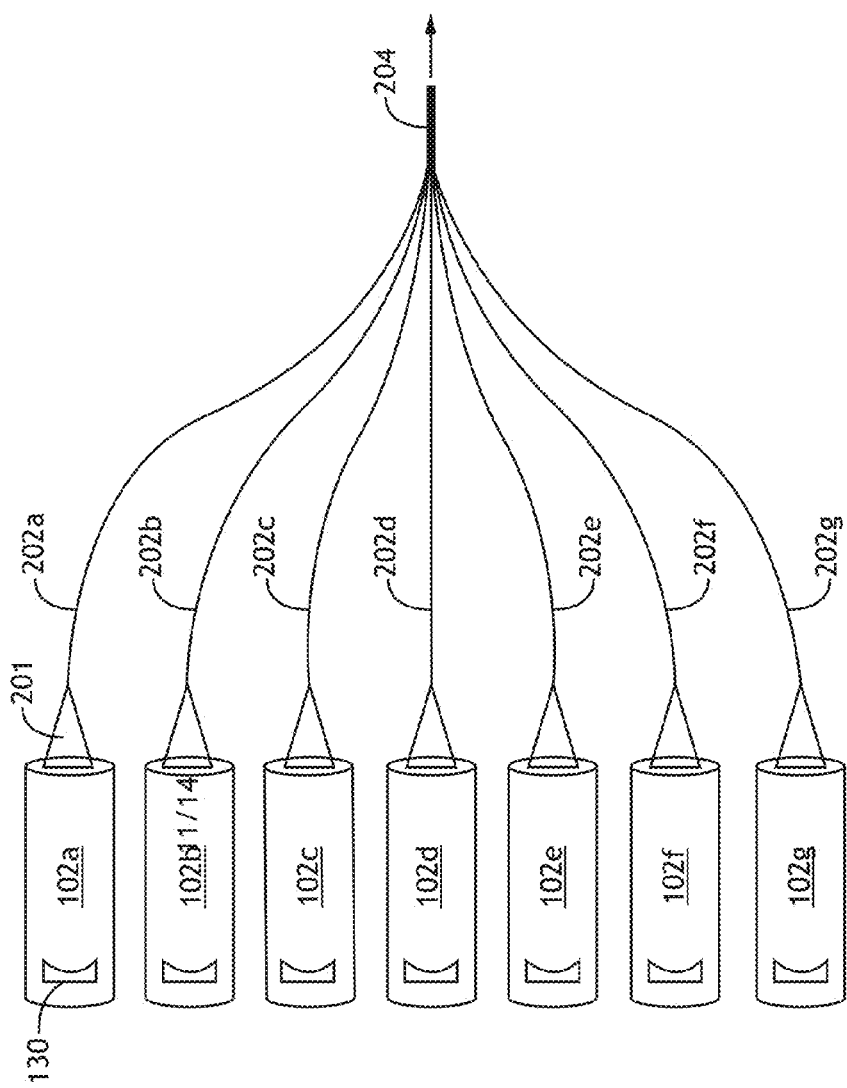
FIG. 2A is a simplified schematic view of a system for forming a high power broadband output, in accordance with one embodiment of the present disclosure.

FIGS. 2A and 2B illustrate system 100 equipped with a set of optical fibers 202a-202g for delivering broadband light from the light sources 102a-102g to a selected target, in accordance with one embodiment of the present disclosure. It is noted herein that the various embodiments and components described previously herein with respect to FIGS. 1B-1K should be interpreted to extend to FIGS. 2A-2B.

In one embodiment, a set of optical fibers 202a-202g are used for transmitting output light from the light-sustained sources 102a-102g to one or more optical elements or targets. In one embodiment, each fiber-source pair is equipped with a source-fiber optical coupler 201 configured to optically couple the broadband light emitted by the given source 102a-102g to the given optical fiber 202a-202g. The optical couplers 201 of system 100 may include any optical coupling technology known in the art of optical fibers, such as, but not limited to, a lens, a light guide and the like.

In another embodiment, two or more of the sources 102a-102g may emit light having different characteristics. For example, two or more of the sources 102a-102g may emit light having different spectral characteristics (e.g., different wavelength ranges of light). By way of another example, two or more of the sources 102a-102g may emit light having different temporal characteristics (e.g., different pulse profiles). By way of another example, two or more of the sources 102a-102g may be light sources of a different type. For instance, one or more of the light sources 102a-102g may include a light-sustained plasma source, while one or more of the sources 102a-102g may include a non-plasma sustained light source (e.g., arc lamp, LED, laser and the like).

In another embodiment, as shown in FIG. 2B, the set of optical fibers 202a-202g are arranged in an optical fiber bundler 204. In this regard, a light output from each of the sources 102a-102g may be delivered to the same downstream optical component or location.

While much of the present disclosure has focused on the production of broadband light with a set of light-sustained plasma sources (e.g., 102a-102e or 160a-160g), the various light sources of the present disclosure are not limited to light-sustained plasma sources. Rather, it is recognized herein that the individual broadband light sources of the present disclosure may include any broadband light source known in the art. For example, the broadband light sources of the present disclosure may include, but are not limited to, a light-sustained plasma source or a discharge lamp, such as an arc lamp (e.g., electric arc lamp or cascade arc lamp).

Figure 3:
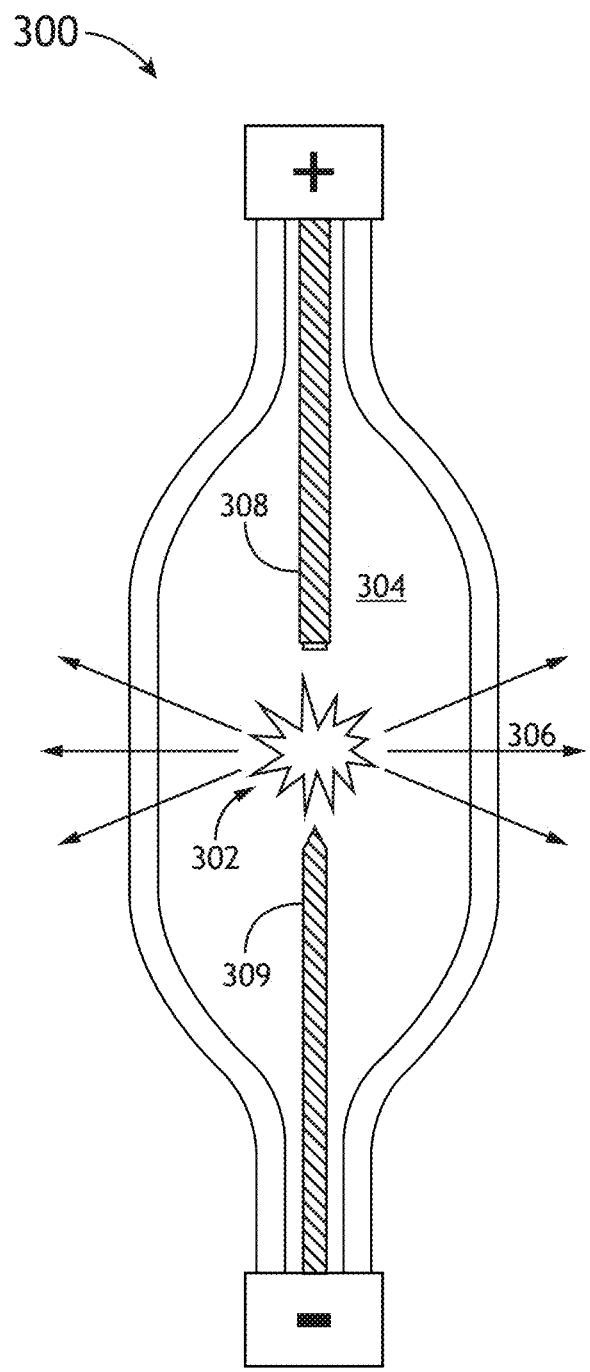
FIG. 3 is a schematic view of an arc lamp for use in the system for forming a high power broadband output, in accordance with one embodiment of the present disclosure.

FIG. 3 illustrates a simplified schematic view of an arc lamp 300 suitable for implementation in any one or more of the light sources of system 100, in accordance with one or more embodiments of the present disclosure. It is noted herein that that the various embodiments and examples of system 100 described previously herein with respect to FIG. 1B through FIG. 2B should be interpreted to extend to arc lamp 300 of FIG. 3. In this regard, arc lamp 300 may be implemented in the context of the embodiments of system 100 depicted in FIG. 1B-1H in order to generate broadband radiation in system 100. For example, the gas containment structure 126 of FIGS. 1D through 1H may be replaced by the arc lamp 300.

It is noted herein that the arc lamp 300 of the present disclosure may take on the form of any arc lamp known in the art and is not limited to the configuration depicted in FIG. 3.

In one embodiment, the arc lamp 300 may include a set of electrodes 308, 309. For example, the arc lamp 300 may include, but is not limited to, the anode 308 and cathode 309 as depicted in FIG. 3. In one embodiment, the set of electrodes 308, 309 may generate a discharge within the volume of gas 304 contained within the plasma lamp 300. In turn, broadband radiation 306 is emitted by the stimulated gas 302. In one embodiment, the broadband radiation 306 emitted by the arc lamp 300 may then be collected and formed into a collimated or focused output as described previously herein in the context of FIGS. 1B-1H. In another embodiment, the broadband radiation 306 emitted by the arc lamp 300 may be collected and formed into an aggregated output via a fiber bundle as described previously herein in the context of FIGS. 2A-2B.

The gas 304 used in the arc lamp may include any gas used in the art of arc lamps. For example, the gas 304 may include, but is not limited to, one or more of Xe, Hg, Xe—Hg, Ar and the like. In addition, the material used to fabricate the arc lamp 300 may take similar forms as those described previously herein in the context of the light-sustained sources 102a-102e or 160a-160g.

FIGS. 4A-4D illustrate a system 400 including a set of light sources 102a-102f arranged in an optical cross-bar configuration, in accordance with one or more embodiments of the present invention. It is noted herein that the various embodiments and components of system 100 and source 300 described in FIGS. 1B-3 should be interpreted to extend to FIGS. 4A-4C.

Figure 4A:
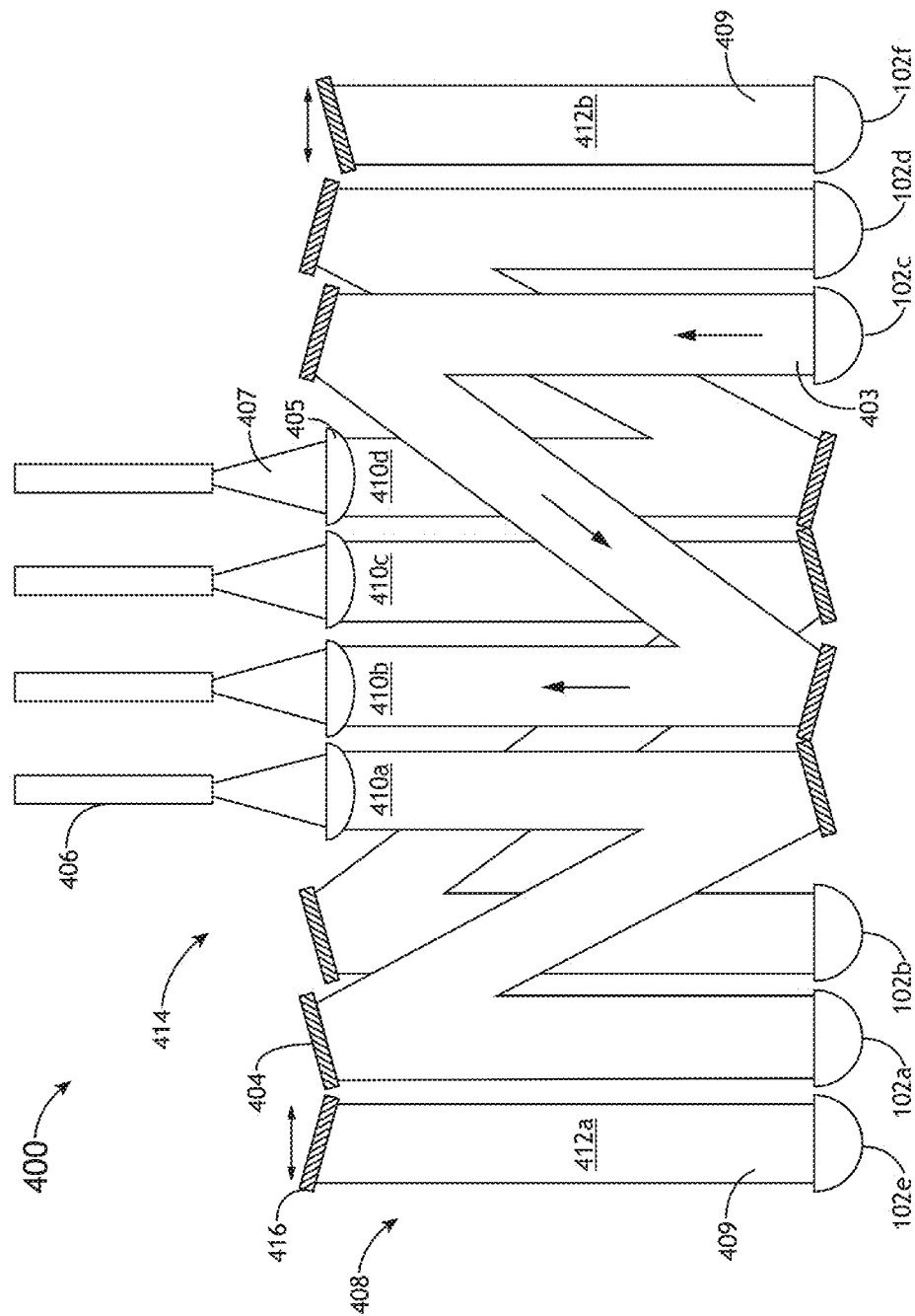
FIGS. 4A-4B are simplified schematic views of a system for forming a high power broadband output through the implementation of an optical cross-bar, in accordance with one embodiment of the present disclosure.
Figure 4B:
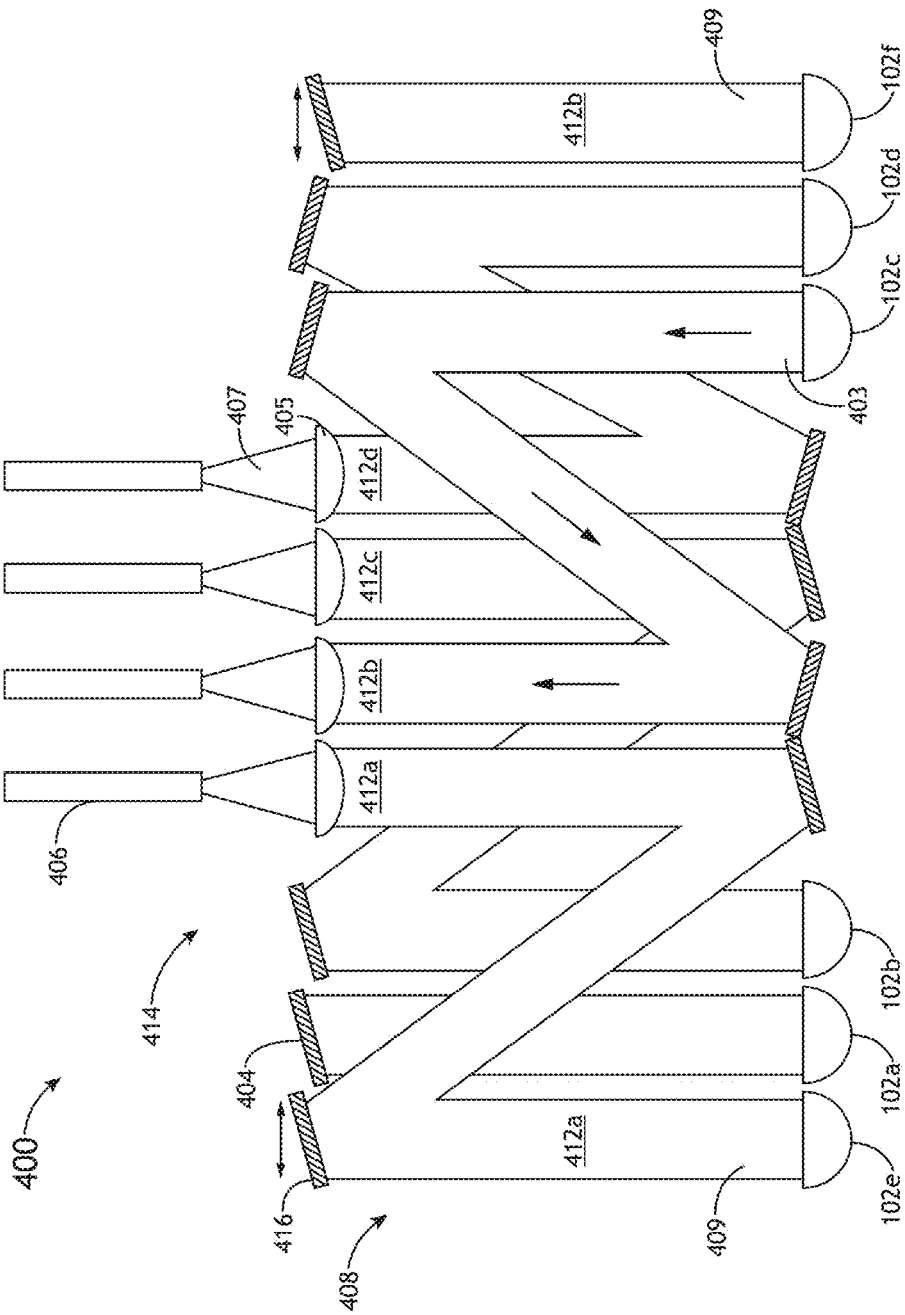

In one embodiment, the optical cross-bar system 400 may couple the light output of one or more light sources 102a-102d to the inputs of a set of sub-homogenizer rods 406 (or a set of light guides or optical fibers). In one embodiment, the optical cross-bar system 400 may transmit the collimated output 403 of the sources 102a-102d to the input of the homogenizer rods 406. In one embodiment, the system 400 includes a set of mirrors 404 for directing the collimated output 403 of the sources 102a-102d to the input of the homogenizer rods 406. In another embodiment, the system 400 includes a set of focusing elements 405 configured to focus the output of each channel 410a-410d of the system 400 onto an entrance surface of one of the sub-homogenizer rods 406, as depicted in FIG. 4A.

In one embodiment, the set of sub-homogenizer rods 406 define an output array 414, which may be delivered to additional optical elements or one or more selected specimens or targets. Applicant notes that while depicted in the form of a simplified two-dimensional schematic, it is recognized herein that the optical configuration 400 and the output array 414 may take on a three-dimensional form.

In one embodiment, the system 400 includes one or more switchable light channels 412a, 412b. In one embodiment, each of the one or more switchable light channels may include a redundant or spare light source 102e, 102f. In another embodiment, each of the one or more switchable light channels 412a, 412b may include one or more mirrors 416 for directing light from the redundant or spare light source 102e, 102f to the sub-homogenizer rods 406. In another embodiment, the one or more switchable light channels 412a, 412b may be selectively switched into the output array 414 so as to manipulate one or more characteristics of the light output by the output array 414.

In another embodiment, the light emitted by the sources 102e, 102f of channels 412a, 412b may have characteristics different from at least some of the sources 102a-102d associated with channels 410a-410d. For example, sources 102e, 102f may emit light having one or more spectral characteristics (e.g., wavelength range), one or more temporal characteristics (e.g., pulse profile) or one or more angular characteristics (e.g., NA) different from light emitted by sources 102a-102d. In this regard, the light output by the output array 414, defined by the set of sub-homogenizer rods 406, may be manipulated or changed by selectively directing the output of the channels 412a, 412b to an input face of the sub-homogenizer rods 406. In another embodiment, one of the channels 410a-410d may be correspondingly switched out of the output array 414 (although this is not a requirement). It is noted herein that the optical cross-bar configuration of system 400 allows for space and angular multiplexing of the output signal across the output array 414, but also provide for the temporal modification of space and angular multiplexing via switchable channels 412a, 412b.

In one embodiment, the one or more switchable light channels 412a, 412b may be, but are not required to be, switched into the output array 414 in the event one or more channels 410a-410d malfunction or begin to operate in a sub-optimal manner. In this regard, the channels 412a, 412b may serve as reserve channels used to maintain the output power and quality of the system 400 during operation.

It is noted that the switching of switchable channels 412a, 412b into the output array 414 (and the switching out of one or more of the 410a-410d channels) may be carried out utilizing any optical switching technology known in the art of optical cross-bar technology. In one embodiment, the mirrors 404 and 416 include actuatable mirrors configured to redirect the reflection from the given mirror. For example, the one or more actuatable mirrors 404, 416 may include, but are not limited to, tiltable mirrors. For instance, the mirrors 416 associated with auxiliary channels 412*a*, 412*b* may be activated such that light reflected from them is coupled into (and out of) the output array 414. For example, such an activation is conceptually depicted in FIG. 4B.

Figure 4C:
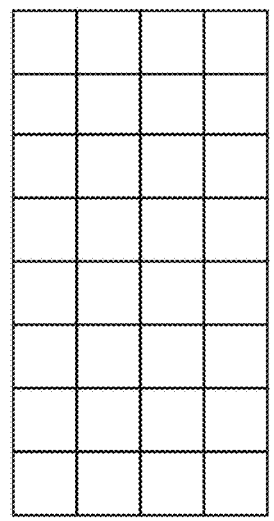
FIGS. 4C-4D are conceptual views of the output array from a set of homogenizer rods of a high power broadband system utilizing an optical cross-bar, in accordance with one embodiment of the present disclosure.
Figure 4D:
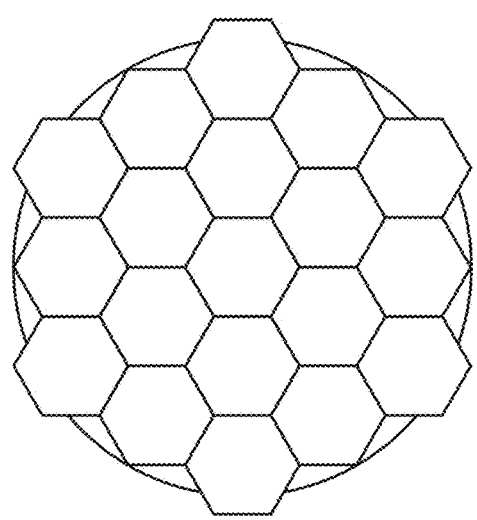

FIGS. 4C and 4D illustrate conceptual views of the output array of system 400, in accordance with one or more embodiments of the present disclosure. FIG. 4C depicts a conceptual view 415 of the output array defined by the sub-homogenizer rods as represented in field space, in accordance with one embodiment of the disclosure. The view 415 is a conceptual representation of the space multiplexing of the output of system 400. FIG. 4D depicts the output array defined by the sub-homogenizer rods as represented in NA space. The view 420 is a conceptual representation of the angular multiplexing of the output of system 400.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a first light-sustained plasma light source including a first reflector element configured to collect broadband light emitted by a first plasma of the first light-sustained plasma light source, the first light-sustained plasma configured to form a first broadband light output;
   an additional light-sustained plasma light source including an additional reflector element configured to collect broadband light emitted by an additional plasma of the additional light-sustained plasma light source, the additional light-sustained plasma configured to form an additional broadband light output; and
   a plurality of optical elements configured to combine the first broadband light output from the first light-sustained plasma light source and the additional broadband light output from the additional light-sustained plasma light source to form an aggregated broadband light beam, wherein the first broadband light output and the additional broadband light output are collimated and the first broadband light output and the additional broadband light output propagate in parallel in at least a portion of a region between the plurality of optical elements and one or more additional optical elements such that the first broadband light output and the additional broadband light output aggregate without overlapping.

2. The system of claim 1, wherein at least one of the first reflector element or the second reflector element include a parabolic reflector element.

3. The system of claim 1, wherein at least one of the first reflector element or the second reflector element include an ellipsoid reflector element.

4. The system of claim 1, wherein the plurality of optical elements configured to combine the first broadband light output from the first light-sustained plasma light source and the additional broadband light output from the additional light-sustained plasma light source to form an aggregated broadband light beam comprises:
   a set of folding mirrors configured to combine the first broadband light output from the first light-sustained plasma light source with the additional broadband light output from the additional light-sustained plasma light source to form an aggregated broadband light beam.

5. The system of claim 1, wherein the plurality of optical elements configured to combine the first broadband light output from the first light-sustained plasma light source and the additional broadband light output from the additional light-sustained plasma light source to form an aggregated broadband light beam comprises:
   a light guiding network configured to combine the first broadband light output from the first light-sustained plasma light source with the additional broadband light output from the additional light-sustained plasma light source to form an aggregated broadband light beam.

6. The system of claim 5, wherein the light guiding network comprises:
   a plurality of input light guides; and
   an output light guide, wherein the plurality of input light guides are configured to transmit the first broadband light output from the first light-sustained plasma light source and the additional broadband light output from the additional light-sustained plasma light source to an entrance surface of the output light guide, wherein the first broadband light output and the additional broadband light output are combined by the output light guide to form an aggregated broadband light beam.

7. The system of claim 6, further comprising:
   a collection aperture; and
   a plurality of sub-apertures, wherein the output light guide fills the collection aperture, wherein each of the input light guides fills one of the sub-apertures.

8. The system of claim 7, wherein at least one of the sub-apertures is configured to select broadband illumination from a selected portion of at least one of the first light-sustained plasma light source or the additional light-sustained plasma light source.

9. The system of claim 1, wherein the first light-sustained plasma light source emits broadband radiation having a first spectral characteristic and the additional light-sustained plasma light source emits broadband radiation having an additional spectral characteristic different from the first spectral characteristic.

10. The system of claim 1, wherein the first light-sustained plasma light source emits broadband radiation having a first temporal characteristic and the additional light-sustained plasma light source emits broadband radiation having an additional temporal characteristic different from the first temporal characteristic.

11. A system comprising:
a first discharge lamp including a first reflector element configured to collect broadband light emitted by a stimulated discharge of the first discharge lamp, the first discharge lamp configured to form a first broadband light output;
an additional discharge lamp including an additional reflector element configured to collect broadband light emitted by a stimulated discharge of the additional discharge lamp, the additional discharge lamp configured to form an additional broadband light output; and
a plurality of optical elements configured to combine the first broadband light output from the first discharge lamp and the additional broadband light output from the additional discharge lamp to form an aggregated broadband light beam, wherein the first broadband light output and the additional broadband light output are collimated and the first broadband light output and the additional broadband light output propagate in parallel in at least a portion of a region between the plurality of optical elements and one or more additional optical elements such that the first broadband light output and the additional broadband light output aggregate without overlapping.

12. The system of claim 11, wherein at least one of the first discharge lamp or the additional discharge lamp comprises:
an arc lamp.

13. The system of claim 11, wherein at least one of the first reflector element or the second reflector element include a parabolic reflector element.

14. The system of claim 11, wherein at least one of the first reflector element or the second reflector element include an ellipsoid reflector element.

15. The system of claim 11, wherein the plurality of optical elements configured to combine the first broadband light output from the first discharge lamp and the additional broadband light output from the additional discharge lamp to form an aggregated broadband light beam comprise:
a set of folding mirrors configured to combine the first broadband light output from the first discharge lamp with the additional broadband light output from the additional discharge lamp to form an aggregated broadband light beam.

16. The system of claim 11, wherein the plurality of optical elements configured to combine the first broadband light output from the first discharge lamp and the additional broadband light output from the additional discharge lamp to form an aggregated broadband light beam comprise:
a light guiding network configured to combine the first broadband light output from the first discharge lamp with the additional broadband light output from the additional discharge lamp to form an aggregated broadband light beam.

17. The system of claim 16, wherein the light guiding network comprises:

a plurality of input light guides; and
an output light guide, wherein the plurality of input light guides are configured to transmit the first broadband light output from the first discharge lamp and the additional broadband light output from the additional discharge lamp to an entrance surface of the output light guide, wherein the first broadband light output and the additional broadband light output are combined by the output light guide to form an aggregated broadband light beam.

18. A system comprising:
a plurality of light-sustained plasma light sources, at least some of the light-sustained plasma light sources comprising:
a pumping source configured to generate pumping illumination;
a gas containment structure configured to receive the pumping illumination from the pumping source to generate plasma within a volume of gas contained within the gas containment structure, wherein at least a portion the gas containment structure is at least partially transparent to at least a portion of the pumping illumination and at least a portion of broadband radiation emitted by the plasma; and
a parabolic reflector element arranged to collect at least a portion of the broadband radiation emitted by the generated plasma and form a collimated broadband radiation output; and
a plurality of optical elements configured to combine the collimated broadband outputs from the parabolic reflector elements of the at least some of the light-sustained plasma light sources into an aggregated broadband beam, wherein a particular optical element is configured to receive a particular collimated broadband output from a particular light-sustained plasma light source, wherein a first collimated broadband light output and an additional collimated broadband light output propagate in parallel in at least a portion of a region between the plurality of optical elements and one or more additional optical elements such that the first collimated broadband light output and the additional collimated broadband light output aggregate without overlapping.

19. The system of claim 18, wherein the plurality of optical elements configured to combine the collimated broadband outputs from the parabolic reflector elements of the at least some of the light-sustained plasma light sources into an aggregated broadband beam comprise:
a plurality of folding mirrors configured to combine the collimated broadband outputs from the parabolic reflector elements of the at least some of the light-sustained plasma light sources into an aggregated broadband beam.

20. The system of claim 18, further comprising:
one or more additional optical elements.

21. The system of claim 20, wherein the one or more additional optical elements comprise:
a homogenizer.

22. The system of claim 20, wherein the one or more additional optical elements comprise:
a focusing element arranged to focus the aggregated broadband beam on an entrance surface of the homogenizer.

23. The system of claim 22, wherein the focusing element comprises:
a focusing mirror.

24. The system of claim 22, wherein the focusing element comprises:
a focusing lens.

25. The system of claim 18, wherein the plurality of light-sustained light sources are arranged in a hexagonal array.

26. The system of claim 18, wherein the parabolic reflector element of at least some of the light-sustained plasma light sources is configured to focus the pumping illumination from the pumping source into the volume of gas in order to generate a plasma within the volume of gas contained within the gas containment structure.

27. The system of claim 18, wherein the gas containment structure of at least some of the light-sustained plasma light sources comprises:
a plasma cell.

28. The system of claim 18, wherein the gas containment structure of at least some of the light-sustained plasma light sources comprises:
a plasma bulb.

29. The system of claim 18, wherein the gas containment structure of at least some of the light-sustained plasma light sources comprises:
a chamber.

30. The system of claim 18, wherein the pumping source of at least some of the light-sustained plasma light sources comprises:
one or more pumping lasers.

31. The system of claim 30, wherein the one or more pumping lasers comprise:
one or more infrared lasers.

32. The system of claim 30 wherein the one or more pumping lasers comprise:
at least one of a diode laser, a continuous wave laser, or a broadband laser.

33. The system of claim 30, wherein the one or more pumping lasers comprise:
one or more lasers configured to provide laser light at substantially a constant power to the plasma.

34. The system of claim 30, wherein the one or more pumping lasers comprise:
one or more modulated lasers configured to provide modulated laser light to the plasma.

35. The system of claim 18, wherein a transparent portion of the gas containment structure of at least some of the light-sustained plasma light sources is formed from at least one of calcium fluoride, magnesium fluoride, lithium fluoride, crystalline quartz, sapphire or fused silica.

36. The system of claim 18, wherein the gas contained within the gas containment structure of at least some of the light-sustained plasma light sources comprises:
at least one of an inert gas, a non-inert gas and a mixture of two or more gases.

37. A system comprising:
a plurality of discharge lamps, at least some of the discharge lamps comprising:
a set of electrodes configured to generate a discharge within a volume of contained gas to generate broadband radiation; and
a parabolic reflector element arranged to collect at least a portion of the broadband radiation associated with the discharge and form a collimated broadband radiation output; and
a plurality of optical elements configured to combine the collimated broadband outputs from the parabolic reflector elements of the at least some of the light-sustained plasma light sources into an aggregated broadband beam, wherein a particular optical element is configured to receive a particular collimated broadband output from a particular discharge lamp, wherein a first collimated broadband light output and an additional collimated broadband light output propagate in parallel in at least a portion of a region between the plurality of optical elements and one or more additional optical elements such that the first collimated broadband light output and the additional collimated broadband light output aggregate without overlapping.

38. The system of claim 37, wherein at least some of the discharge lamps comprise:
an arc lamp.

39. A system comprising:
a plurality of broadband light sources;
a plurality of sub-homogenizer rods;
a plurality of optical elements arranged in an optical cross-bar configuration, wherein at least a portion of the optical elements are selectively activatable optical elements configured to selectively couple at least a portion of the plurality of broadband light sources to the plurality of sub-homogenizer rods; and
a plurality of optical fibers, wherein an output of each broadband light source is optically coupled to an input of one of the optical fibers, wherein outputs for two or more of the optical fibers are consolidated into a fiber bundle.

40. The system of claim 39, wherein at least some of the broadband light sources comprise:
a light-sustained plasma light source.

41. The system of claim 39, wherein at least some of the broadband light sources comprise:
an arc lamp.

42. The system of claim 39, wherein at least one of the broadband light sources is a first type of broadband light source and at least one of the broadband light sources is a second type of broadband light source different from the first type of broadband light source.

43. The system of claim 39, wherein at least some of the broadband light sources include at least one of a parabolic reflector element or an ellipsoid reflector element.

44. The system of claim 39, wherein the selectively activatable optical elements comprise:
selectively tiltable mirrors.

* * * * *